(12) United States Patent
McCormack et al.

(10) Patent No.: US 8,799,251 B2
(45) Date of Patent: Aug. 5, 2014

(54) DOCUMENT TEMPLATES FOR SCHEMA-BASED DATA TRANSFER INTO AND OUT OF A DATA-BASED APPLICATION

(75) Inventors: Michael J. McCormack, Snohomish, WA (US); Jorn L. Mortensen, Redmond, WA (US); Marc V. El Haddad, Redmond, WA (US); Michelle A. Watkins, Bellevue, WA (US); Rutuja V. Khanzode, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1465 days.

(21) Appl. No.: 12/146,614

(22) Filed: Jun. 26, 2008

(65) Prior Publication Data

US 2009/0327321 A1   Dec. 31, 2009

(51) Int. Cl.
 *G06F 17/30* (2006.01)
(52) U.S. Cl.
 USPC .................................. 707/705; 707/999.1
(58) Field of Classification Search
 USPC ............................................. 707/705, 999.1
 See application file for complete search history.

(56) References Cited

U.S. PATENT DOCUMENTS

| | | | |
|---|---|---|---|
| 7,127,672 B1 | 10/2006 | Patterson et al. | |
| 7,155,455 B2 | 12/2006 | Clendenin | |
| 7,225,189 B1 * | 5/2007 | McCormack et al. | 1/1 |
| 7,249,316 B2 | 7/2007 | Collie et al. | |
| 7,337,182 B2 | 2/2008 | Rothschiller et al. | |
| 2004/0172616 A1 | 9/2004 | Rothschiller et al. | |
| 2005/0071801 A1 | 3/2005 | Jesse et al. | |
| 2005/0091346 A1 | 4/2005 | Krishnaswami et al. | |
| 2005/0120029 A1 | 6/2005 | Tomic et al. | |
| 2005/0257193 A1 | 11/2005 | Falk et al. | |
| 2006/0112329 A1 * | 5/2006 | Collie et al. | 715/513 |
| 2006/0206502 A1 | 9/2006 | Gaurav et al. | |
| 2006/0212432 A1 * | 9/2006 | Tsai | 707/3 |
| 2006/0277222 A1 | 12/2006 | Dickinson et al. | |
| 2007/0073712 A1 | 3/2007 | Falk et al. | |
| 2007/0112843 A1 * | 5/2007 | Swamy et al. | 707/102 |
| 2007/0203922 A1 * | 8/2007 | Thomas | 707/100 |
| 2008/0071817 A1 | 3/2008 | Gaurav et al. | |
| 2008/0281820 A1 * | 11/2008 | Do et al. | 707/6 |

OTHER PUBLICATIONS

Rice, "Creating XML Mappings in Excel 2003", Feb. 2005. (retrieved Apr. 25, 2008) http://msdn2.microsoft.com/en-us/library/aa203737(office.11).aspx.

(Continued)

*Primary Examiner* — Mahesh Dwivedi
(74) *Attorney, Agent, or Firm* — Damon Rieth; David Andrews; Micky Minhas

(57) ABSTRACT

Systems and methods are described for using templates associated with a document application to facilitate schema-based data transfers into and out of a database associated with a database application. Such templates may be made available to a user so that the user can easily export various data entities out of the database for display, editing, or report generation as well as to import new or edited data entities into the database. The templates may include fixed or user-customizable reports that are populated with data entities exported from the database and/or that present data and graphics derived from such data entities. The templates may also be created during an initial data transfer between a first document and the database and then saved for use in performing subsequent data transfers between other documents and the database.

20 Claims, 22 Drawing Sheets

(56) References Cited

OTHER PUBLICATIONS

Peter, "Microsoft Office System and XML: Bringing XML to the Desktop", Sep. 2003. (retrieved Apr. 25, 2008) http://msdn2.microsoft.com/en-us/library/aa159914.aspx.

"Overview of Office 2003 Developer Technologies", Microsoft Corporation. Oct. 2004. (retrieved Apr. 25, 2008) http://msdn2.microsoft.com/en-us/library/aa159917.aspx.

\* cited by examiner

Export from Data-based Application to Document Application

Import into Data-based Application from Document Application

DOCUMENT TEMPLATES FOR SCHEMA-BASED DATA TRANSFER INTO AND OUT OF A DATA-BASED APPLICATION

BACKGROUND

A user of a data-based application may find it desirable to export data out of the data-based application into a document application, such as a spreadsheet or word processing application, for editing or report generation. This may be because the document application offers different or improved editing or report generation features as compared to the data-based application. This may also be because the user is simply more familiar with the editing or report generation features of the document application as compared to the data-based application. A user of the data-based application may also find it desirable to import new or updated data from the document application back into the data-based application.

Conventional methods for transferring data between a data-based application and a document application are limited. For example, certain tools currently used for importing/exporting data between a database associated with a data-based application and a spreadsheet associated with a spreadsheet application require column header names within the spreadsheet to precisely match field names within the database for a successful import/export to occur. This can lead to problems if the column header names within the spreadsheet are changed for any reason. Furthermore, certain conventional import/export tools require the spreadsheet data to be arranged in a tabular fashion and located in a particular location within the spreadsheet for a successful import/export to occur. This severely restricts the manner in which the spreadsheet can be used for organizing data and generating reports.

Conventional import/export protocols associated with document and data-based applications also require a significant level of user involvement each time that a data set is to be transferred into or out of an application, regardless of whether or not the user has transferred a version of the data set before. For example, users may be required to ensure compliance with certain data formatting requirements or perform certain mapping functions each time an import/export is executed.

Conventional data-based and document applications also do not provide a seamless way to transfer data from a database associated with a data-based application to a document associated with a document application for editing and then to transfer the edited data from the document back into the database. For example, such applications do not provide a reliable means for matching and reconciling data entities in the database with updated copies of the same entities that are transferred back into the database from the document.

What is needed, then, is a system and method for transferring data between a data-based application and a document application that addresses one or more of the foregoing limitations associated with conventional import/export protocols.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for importing data into a database associated with a data-based application based on a template associated with a document application is described herein. In accordance with one implementation of the method, data entities entered into fields of the template by a user are transferred to a structured data document in accordance with a map associated with the template. The structured data document and connection information associated with the template are then provided to a database integration engine. The connection information identifies a schema definition to be used by the database integration engine to extract the data entities from the structured data document. The connection information also identifies a data set within the database within which the extracted data entities are to be inserted by the database integration engine.

A method for populating fields within a template associated with a document application based on data stored in a database associated with a data-based application is also described herein. In accordance with one implementation of the method, connection information associated with the template is provided to a database integration engine. The connection information identifies a data set within the database from which data entities are to be extracted. The connection information also identifies a schema definition to be used by the database integration engine to generate a structured data document that includes the extracted data entities. The structured data document is received from the database integration engine. The extracted data entities are transferred from the structured data document to the template fields in accordance with a map associated with the template.

A method for providing a template for transferring data into or out of database associated with a data-based application is also described herein. In accordance with one implementation of the method, a map is saved that maps fields of a first document associated with a document application to a schema definition. The map was used to insert data entities into or extract data entities from a structured data document used for transferring the data entities between the fields of the first document and a data set within the database. Connection information is also saved. The connection information was used to identify the data set within the database into which the data entities were transferred or from which the data entities were transferred and to identify the schema definition. The saved map and connection information are them made available to a user for association with a second document associated with the document application.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
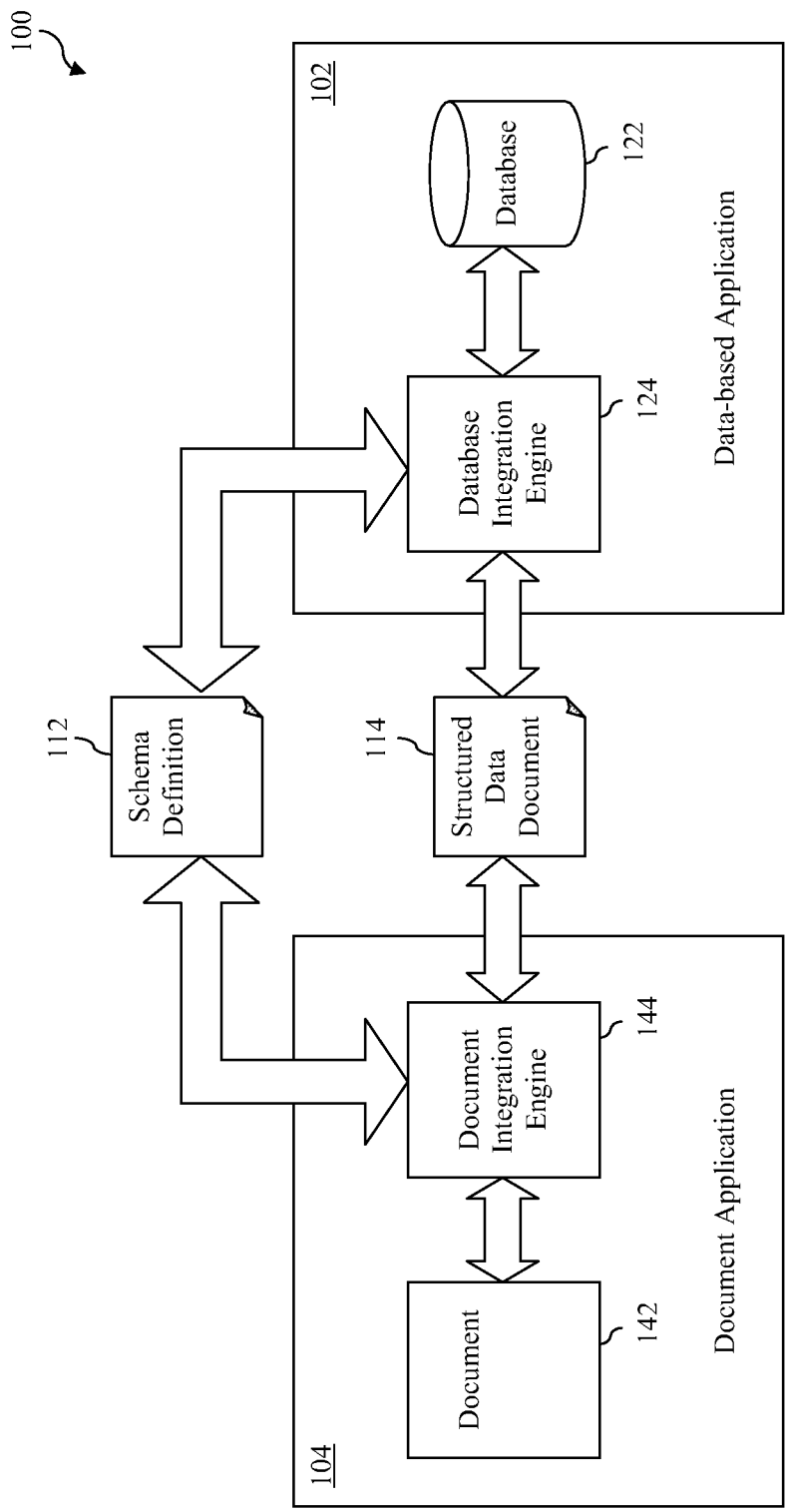
FIG. 1 is a block diagram of a system for performing schema-based data transfers between a data-based application and a document application in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. System Overview

FIG. 1 is a block diagram of an example system 100 for performing schema-based data transfers between a data-based application and a document application in accordance with an embodiment of the present invention. As shown in FIG. 1, system 100 includes a data-based application 102 and a document application 104. Data-based application 102 is intended to broadly represent any software application that is configured to manage, populate and/or access a database in performing functions for or delivering services to a user. In one embodiment, data-based application 102 comprises a version of MICROSOFT OFFICE ACCOUNTING, published by Microsoft Corporation of Redmond, Wash. Document application 104 is intended to broadly represent any software application that is configured to facilitate the generation of customized documents, such as spreadsheets or word processing documents, by or for a user. In one embodiment, document application 104 comprises a version of MICROSOFT EXCEL, a spreadsheet application published by Microsoft Corporation of Redmond, Wash., although the invention is not so limited. In another embodiment, document application 104 comprises a version of MICROSOFT WORD, a word processing application published by Microsoft Corporation of Redmond, Wash. In a further embodiment, document application 104 comprises a version of MICROSOFT OFFICE INFOPATH, an application that may be used to develop XML-based data entry forms published by Microsoft Corporation of Redmond, Wash.

Each of data-based application 102 and document application 104 is installed in a memory of a computer system (not shown in FIG. 1) and is configured for execution by one or more processors associated with the computer system responsive to input from a user. In one embodiment, data-based application 102 and document application 104 are installed on and executed by the same computer system. In an alternate embodiment, each of data-based application 102 and document application 104 are installed on and executed by a different computer system. In this latter embodiment, it is to be understood that the two different computer systems are connected by a communication link, such as a local area or wide area network, which enables data to be transferred between the two applications in a manner to be described herein.

An example computer system upon which either or both of data-based application 102 and document application 104 may be installed and executed will be described below in reference to FIG. 23.

Depending upon the implementation, a user may launch and invoke functions of data-based application 102 or document application 104 through direct interaction with the computer system upon which each application is installed. Alternatively, a user may launch and invokes functions of each of these applications by causing commands to be transmitted from a local computer to a remote computer upon which the application is installed. In this latter embodiment, the application may be termed an "online application."

As shown in FIG. 1, data-based application includes a database 122 and a database integration engine 124. Database 122 is intended to broadly represent any structured collection of records or data. Database 122 may comprise, for example and without limitation, a relational database, a hierarchical database, or a network database. In an embodiment in which data-based application 102 is a version of MICROSOFT OFFICE ACCOUNTING, database 122 comprises a relational database that stores accounting records associated with a particular company. In an embodiment, database 122 comprises one of multiple databases that may be managed, populated or accessed by data-based application 102. Database 122 is stored in memory accessible to the computer system upon which data-based application 102 is installed. Depending upon the implementation, the memory in which database 122 is stored may be local or remote with respect to the computer system upon which data-based application 102 is installed.

Database integration engine 124 comprises logic that is configured to enable data stored within database 122 to be transferred to document application 104 for insertion within or updating of a document associated with document application 104. Database integration engine 124 is also configured to enable data stored within a document associated with document application 104 to be received by data-based application 102 for insertion within or updating of database 122. The manner in which database integration engine 124 operates to perform these functions will be described in more detail herein.

As further shown in FIG. 1, document application 104 includes a document 142 and a document integration engine 144. Document 142 is intended to broadly represent any digital representation of information that may be generated or accessed by document application 104 for the purpose of viewing, printing or editing. In an embodiment in which document application 104 is a version of MICROSOFT EXCEL, document 142 comprises a workbook, which itself comprises one or more spreadsheets. In an embodiment in which document application 104 is a version of MICROSOFT WORD, document 142 comprises a word processing document.

Document 142 comprises one of multiple documents that may be generated or accessed by document application 104. Document 142 is stored in memory accessible to the computer system upon which document application 104 is installed. Depending upon the implementation, the memory in which document 142 is stored may be local or remote with respect to the computer system upon which document application 104 is installed.

Document integration engine 144 comprises logic that is configured to enable data stored within document 142 to be transferred to data-based application 102 for insertion within or updating of a database associated with data-based application 102. Document integration engine 144 is also configured to enable data stored within a database associated with data-based application 102 to be received by document application 104 for insertion within or updating of document 142. The manner in which document integration engine 144 operates to perform these functions will be described in more detail herein.

Each of database integration engine 124 and document integration engine 144 is configured to organize data to be transferred to the other application in a structured format, thereby generating a structured data document 114. The format used to generate structured data document 114 is specified by a schema definition 112. In one embodiment, the structured data document 114 comprises a markup language document such as an Extensible Markup Language (XML) document, although the invention is not so limited. In an embodiment in which structured data document 114 comprises an XML document, schema definition 112 may comprise an XML schema definition (XSD). As will be appreciated by persons skilled in the relevant art(s), an XSD defines a type of XML document by dictating what elements and attributes may appear in the XML document, the relationship between such elements and attributes, the types of data that may be associated with such elements and attributes, and the like.

Each of database integration engine 124 and document integration engine 144 is also configured to receive data transferred from the other application in the form of a structured data document 114 and to use a schema definition 112 to extract data entities therefrom. Database integration engine 124 is configured to map each of these extracted data entities to a database schema associated with database 122 so that the extracted data entities may be inserted within database 122 or used to update corresponding data entities within database 122. Document integration engine 144 is configured to map each of these extracted data entities to unique fields within document 142 so that the extracted data entities may be inserted within those fields.

In an embodiment, schema definition 112 is one of a plurality of schema definitions made available to data-based application 102 and document application 104 for the purpose of facilitating a schema-based data transfer between the two applications. Each schema definition in the plurality of schema definitions may correspond to a particular type of data set to be imported into or exported out of database 122 by database integration engine 124. Such schema definitions may be provided to or obtained by the user from, for example, a publisher of either or both of data-based application 102 and document application 104. For example, such schemas may be loaded into system memory during installation of either or both applications. Alternatively, such schema definitions may be dynamically generated by database integration engine 124 based on a data entity map associated with a database to/from which data is to be transferred.

The use of structured data documents and associated schema definitions to transfer data between data-based application 102 and document application 104 advantageously provides each application with the ability to receive and properly interpret data from the other application irrespective of how such data was labeled or stored by the other application. The use of shared schema definitions also ensures compatibility between the import/export functionality of each application. All of the foregoing allows for less user involvement in and increased reliability of the data transfer process, which greatly improves the end user experience.

In one embodiment of the present invention, after data has initially been transferred between database 122 and document 142, certain connection information used to perform that data transfer is maintained by document application 104. This connection information defines a link between fields within document 142 and a data set within database 122 that were involved in the initial data transfer. This connection information is then advantageously used to allow for easy updating of the fields within document 142 based on information currently residing in the data set within database 122 as well as to allow for easy updating of the data set within database 122 based on information currently residing in the fields of document 142.

Section B below will describe a manner by which data entities are initially transferred between a database associated with data-based application 102 and a document associated with document application 104 and how the aforementioned connection information is established during the performance of such a data transfer.

Section C below will then describe how this connection information may be used to facilitate easy updating of the document based on information currently residing in the database as well as easy updating of the database based on information currently residing in the document.

B. Initial Transfer of Data Entities Between Data-Based Application and Document Application Depending upon the implementation, a user may perform an initial transfer of data entities between a database associated with data-based application 102 and a document associated with document application 104 by invoking import or export functionality associated with document application 104 or by invoking import or export functionality associated with data-based application 102. Each of these various approaches will now be described.

1. Import of Data Entities into Document Application

Figure 2:
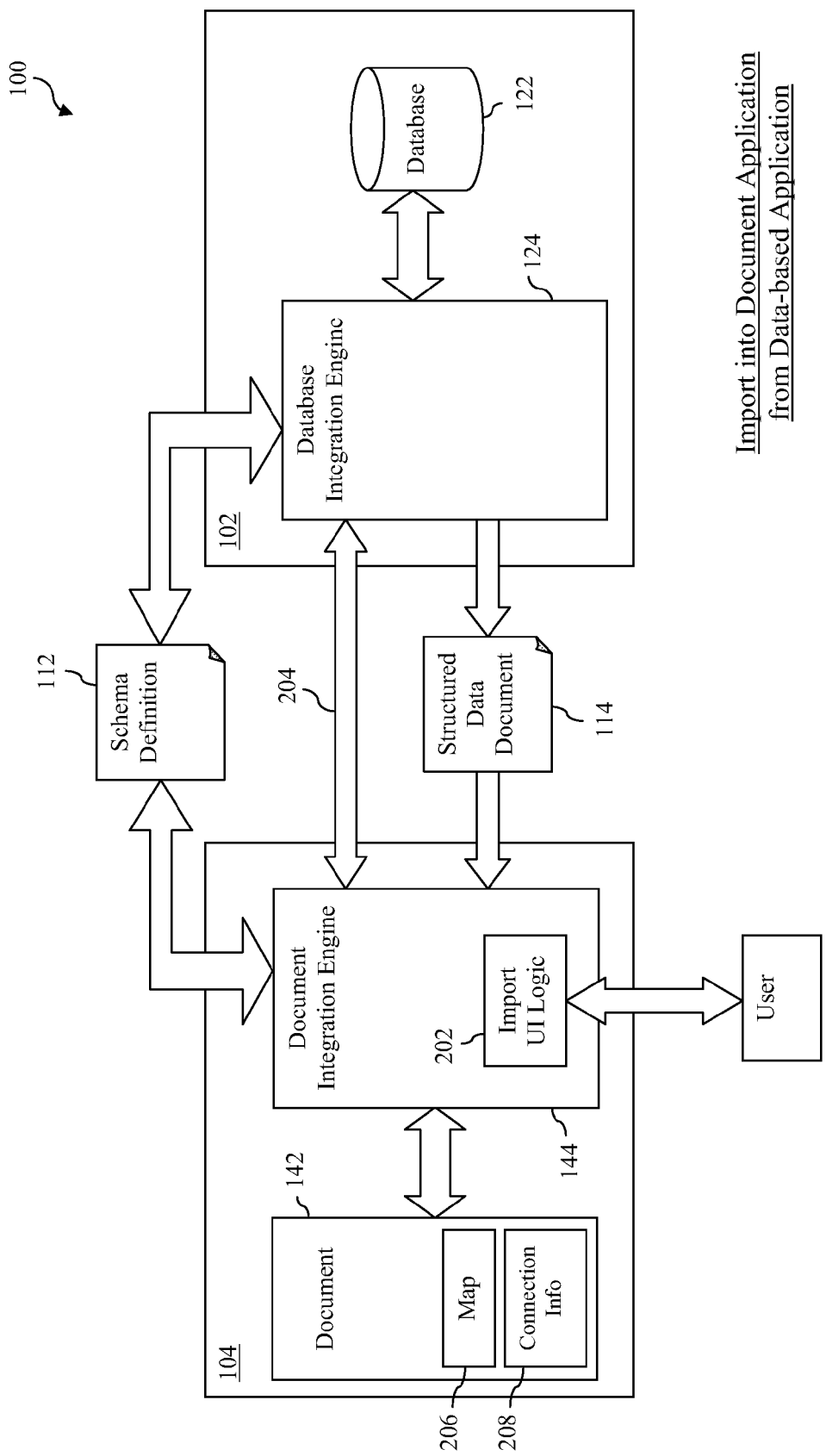
FIG. 2 is a block diagram of a system for performing a schema-based import of data into a document application from a data-based application in accordance with an embodiment of the present invention.

In one scenario, a user imports data entities from a database associated with data-based application 102 into a document associated with document application 104 by invoking import functionality of document application 104. FIG. 2 is a block diagram of system 100 that depicts additional implementation details relevant to such a scenario. Steps involved in performing such an import will now be described in reference to flowchart 300 of FIG. 3. The method of flowchart 300 is described herein by way of example only and is not intended to limit the present invention. Furthermore, although the steps of flowchart 300 may be described with reference to various logical and/or physical entities shown in FIG. 2, persons skilled in the relevant art(s) will readily appreciate that the method need not be implemented using such entities.

Figure 3:
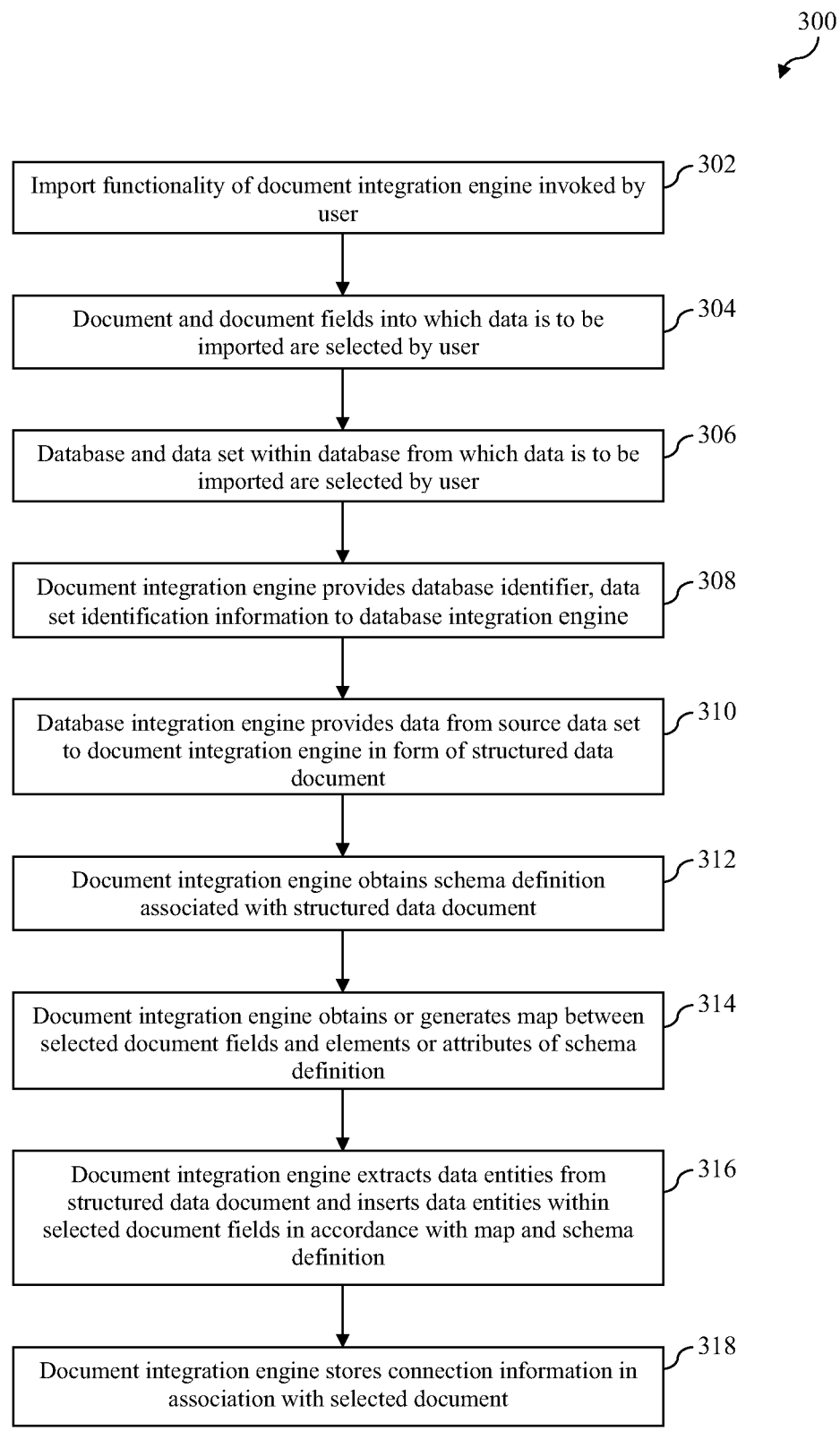
FIG. 3 depicts a flowchart of a method for performing a schema-based import of data into a document application from a data-based application in accordance with an embodiment of the present invention.

As shown in FIG. 3, the method of flowchart 300 begins at step 302 in which import functionality of document integration engine 144 is invoked by a user. The user may invoke the import functionality of document integration engine 144, for example, by interacting with a graphical user interface (GUI) that is presented to the user by document application 104.

At step 304, a document and document fields into which data is to be imported are selected by the user. The document may be explicitly selected by the user through interaction with import user interface (UI) logic 202, which is part of document integration engine 144 as shown in FIG. 2. For example, the user may interact with GUI elements generated by import UI logic 202 to select the document into which data is to be imported. Alternatively, the document may be implicitly selected by the user through some other user gesture. For example, a document that the user opened or was viewing prior to invoking the import functionality in step 302 may be deemed the selected document. For the remainder of the description of this method, it will be assumed that the user has selected document 142 as the document into which data is to be imported.

The document fields into which data is to be imported may also be explicitly selected by the user. The user may explicitly select such document fields, for example, by selecting one or more cells or tables within document 142 into which data is to be imported in a case where document 142 is a spreadsheet. Alternatively, the user may implicitly select the document fields through some other user gesture. A user may do this, for example, by selecting a template as the target document for import. As used herein, the term "template" refers to a document associated with document application 104 that has been specially designed for inputting, editing or viewing data to be transferred to/from a database associated with data-based application 102. In one embodiment, a template includes a predefined notion of which document fields are to be targeted for import. In a still further embodiment, the document fields into which data is to be imported are selected automatically by document integration engine 144 in accordance with some default setting or user preference.

At step 306, a database and data set within the database from which data is to be imported are selected by the user. In one embodiment, the user selects the database and the source data set through interaction with import UI logic 202 of document integration engine 144. For the remainder of the description of this method, it will be assumed that the user has selected database 122 as the database from which data is to be imported.

In one embodiment in which data-based application 102 is an accounting application such as MICROSOFT OFFICE ACCOUNTING, the user may select the source data set by providing or selecting (1) a company, (2) a master record, document or report list associated with a company, and one/or (3) or more query parameters to be applied. A master record, document or report list may comprise a table or view in database 122. The user may also select the source data set by specifying certain database fields that are to be included in the import.

In an alternate embodiment, at least a portion of the foregoing information used to select the source data set within database 122 is provided in association with a template selected by the user as the target document for import. For example, the selection of a particular template may dictate the master record, document or report list from which data is to be imported but not the company from which such data is to be imported.

At step 308, document integration engine 144 provides an identifier of the database selected in step 306 and information that identifies the data set selected in step 306 to database integration engine 124. This information may be provided by way of a communication link 204 established between document integration engine 144 and database integration engine 124, as shown in FIG. 2. In response to receiving this information, database integration engine 124 uses the received information to extract data entities from the identified data set in database 122. Database integration engine 124 also uses this information to select a schema definition that is appropriate for transferring data from the source data set. For the remainder of the description of this method, it will be assumed that schema definition 112 is selected as the schema definition that is appropriate for transferring data from the source data set.

Database integration engine 124 then inserts the data entities extracted from database 122 into a structured data document 114. Database integration engine 124 performs this step by mapping between elements and attributes of a database schema associated with database 122 and elements and attributes of schema definition 112. Based on this mapping, database integration engine 124 inserts extracted data entities into structured data document 114.

At step 310, database integration engine 124 provides the data from the source data set within database 122 to document integration engine 144 in the form of structured data document 114.

At step 312, document integration engine 144 obtains schema definition 112 associated with structured data document 114. An identifier of the appropriate schema definition may be included within structured data document 114. Alternatively, an identifier of the appropriate schema definition may be communicated from database integration engine 124 to document integration engine 144 over communication link 204. Still further, the identity of the appropriate schema definition may be determined by document integration engine 144 based on the selection of a particular source data set by the user in step 306, or based upon the selection of a particular template by the user as the import target document.

At step 314, document integration engine obtains or generates a map 206 between the target document fields selected in step 304 and element or attributes of schema definition 112. The mapping of document fields to elements or attributes of a schema definition is known in the art. For example, U.S. Pat. No. 7,249,316 to Collie et al. (incorporated by reference herein) describes a method by which a user can generate a map between cells and list objects of a spreadsheet and elements or attributes of a schema definition. U.S. Pat. No. 7,249,316 further describes the use of such a map to import a markup language data file to the spreadsheet and to export a markup language data file from the spreadsheet.

Map 206 between the target document fields and elements or attributes of schema definition 112 may be generated by a user through interaction with import UI logic 202 in a similar manner to that described in U.S. Pat. No. 7,249,316. Alternatively, map 206 may be dynamically generated by document integration engine 144 during the import process. Once generated, map 206 is stored in association with document 142. In the embodiment shown in FIG. 2, map 206 is embedded within document 142. One example of embedding a map within a document is described in U.S. Pat. No. 7,249,316, in which markers known as XPATHs are stored in a spreadsheet document to point a given cell or list object to a corresponding element or attribute in an associated schema definition.

In an alternate embodiment, the target document fields may be "pre-mapped" to the elements and attributes of schema definition 112 in an instance where a template is designated as the target document for the import. In this instance, map 206 exists in association with document 142 prior to execution of the import process.

At step 316, document integration engine 144 extracts data entities from structured data document 114 and inserts the extracted data entities within the selected document fields in accordance with map 206 obtained or generated in step 314 and schema definition 112.

At step 318, document integration engine 144 stores connection information 208 used during the import process in association with document 142. In the embodiment shown in FIG. 2, connection information 208 is embedded within document 142. In an embodiment in which document 142 is an EXCEL spreadsheet, the embedding of connection information 208 within document 142 may be achieved, for example, by storing connection information 208 in a very hidden worksheet within document 142.

As will be described in more detail herein, the storage of connection information 208 in association with document 142 facilitates subsequent updates of the target document fields in document 142 with the latest data stored in the associated data set in database 122. Also, the storage of connection information 208 in association with document 142 facilitates subsequent updating of data stored in the associated dataset in database 122 based on data currently stored in the target document fields in document 142. Such updates may be performed in a manner that is highly automated, reliable and easily managed by a user.

In an embodiment, connection information 208 includes information sufficient to identify database 122 from which data was imported, the data set within database 122 from which data was imported, and schema definition 112 used to generate structured data document 114. As noted above, the information used to identify the data set within database 122 from which data was imported may include (1) a company, (2) a master record, document or report list associated with a company, and/or (3) one or more query parameters that were applied. As also noted above, the information used to identify the data set may also include certain database fields that were included in the import.

Table 1 below shows example elements that may be included in connection information 208 in an embodiment in which data-based application 102 is a version of MICROSOFT OFFICE ACCOUNTING and document application 104 is a version of MICROSOFT EXCEL. However, this table is provided by way of example only and persons skilled in the art will appreciate that other types of connection information and methods of organizing such information may be used in accordance with various embodiments of the present invention.

TABLE 1

| | Example Connection Information | |
|---|---|---|
| Element | Attribute | Content; Purpose/Description |
| connection | Xmlns | MOA Namespace, a unique identification for all of the elements belonging to MICROSOFT OFFICE ACCOUNTING |

TABLE 1-continued

Example Connection Information

| Element | Attribute | Content; Purpose/Description |
| --- | --- | --- |
| connection | | Root node representing this connection. Linked to a specific EXCEL Schema via ID |
| companyGuid | | Unique identifier for the Company |
| companyName | | Name of the Company that the query applies to. |
| schemaID | | The ID/Name of the schema that this connection block applies to. This allows for accurate identification of the schema, and refreshing of the appropriate data blocks |
| schemaVersion | | Schema version number following standard 1.0.0.0 format |
| MOA Version | | Version of MICROSOFT OFFICE ACCOUNTING |
| serverName | | Name of a server that the data resides upon |
| downloadDateTime | | Date and time that the download occurred |
| filters | | An optional, unbounded list that contains name value pairs used to describe a set of predefined parameters for a query. All POSSIBLE parameters are sent into EXCEL, and they are all sent back to MICROSOFT OFFICE ACCOUNTING. However nilled parameters are ignored (treated as clear). |
| filter | | Element containing the filter details |
| filter | field | The name of the filter field in question, provided by MOA. |
| filter | type | The type of the parameter that is expected |
| filter | min | Min value of a possible filter range |
| filter | max | Max value of a possible filter range |
| fields | | Collection of fields that are being returned |
| field | | Name of the field that is being returned |
| rowsChecksum | | Validation mechanism for verifying row data on the set |
| row | | Repeating element that contains the row validation data |
| row | primaryKey | Integer primary key of the row |
| row | checksum | Checksum value for the row and columns identified and managed |

As shown in Table 1, in one embodiment of the present invention, a unique primary key associated with each database row imported from database 122 is stored as part of connection information 208. As will be discussed in more detail herein, this allows for matching of rows stored in document 142 to rows stored in database 122 when data is subsequently transferred from document application 104 back to data-based application 102. Such matching can advantageously be used to perform error checking operations. As also shown in Table 1, a checksum value is also stored in association with each database row imported from database 122. This checksum is based on the imported data entities associated with the row and may be advantageously used to determine if a user has changed the contents of the row in document 142 when data is subsequently transferred from document application 104 back to data-based application 102.

2. Export of Data Entities from Document Application

Figure 4:
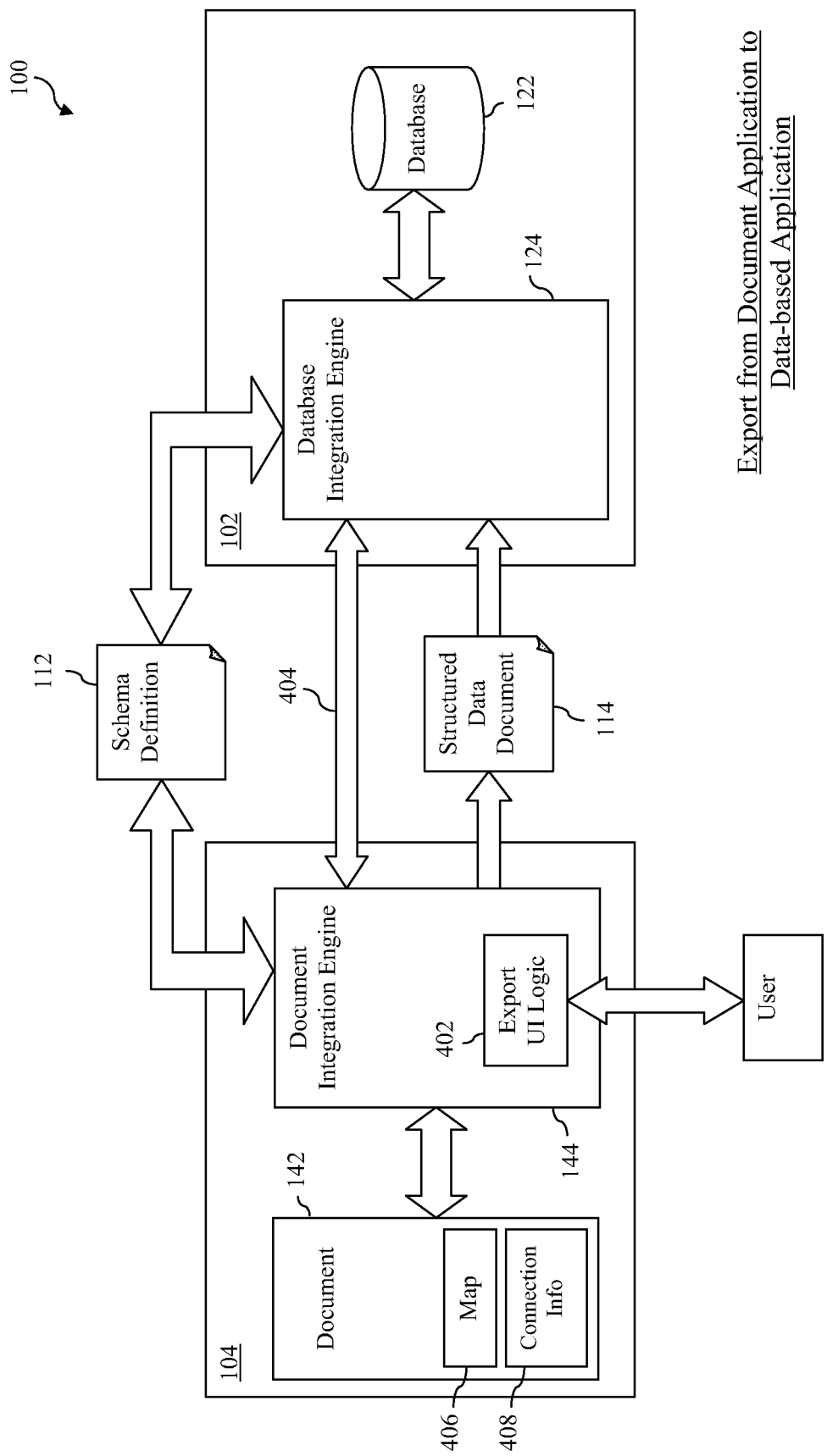
FIG. 4 is a block diagram of a system for performing a schema-based export of data from a document application to a data-based application in accordance with an embodiment of the present invention.

In one scenario, a user exports data entities from a document associated with document application 104 to a database associated with data-based application 102 by invoking export functionality of document application 104. FIG. 4 is a block diagram of system 100 that depicts additional implementation details relevant to such a scenario. Steps involved in performing such an export will now be described in reference to flowchart 500 of FIG. 5. The method of flowchart 500 is described herein by way of example only and is not intended to limit the present invention. Furthermore, although the steps of flowchart 500 may be described with reference to various logical and/or physical entities shown in FIG. 4, persons skilled in the relevant art(s) will readily appreciate that the method need not be implemented using such entities.

Figure 5:
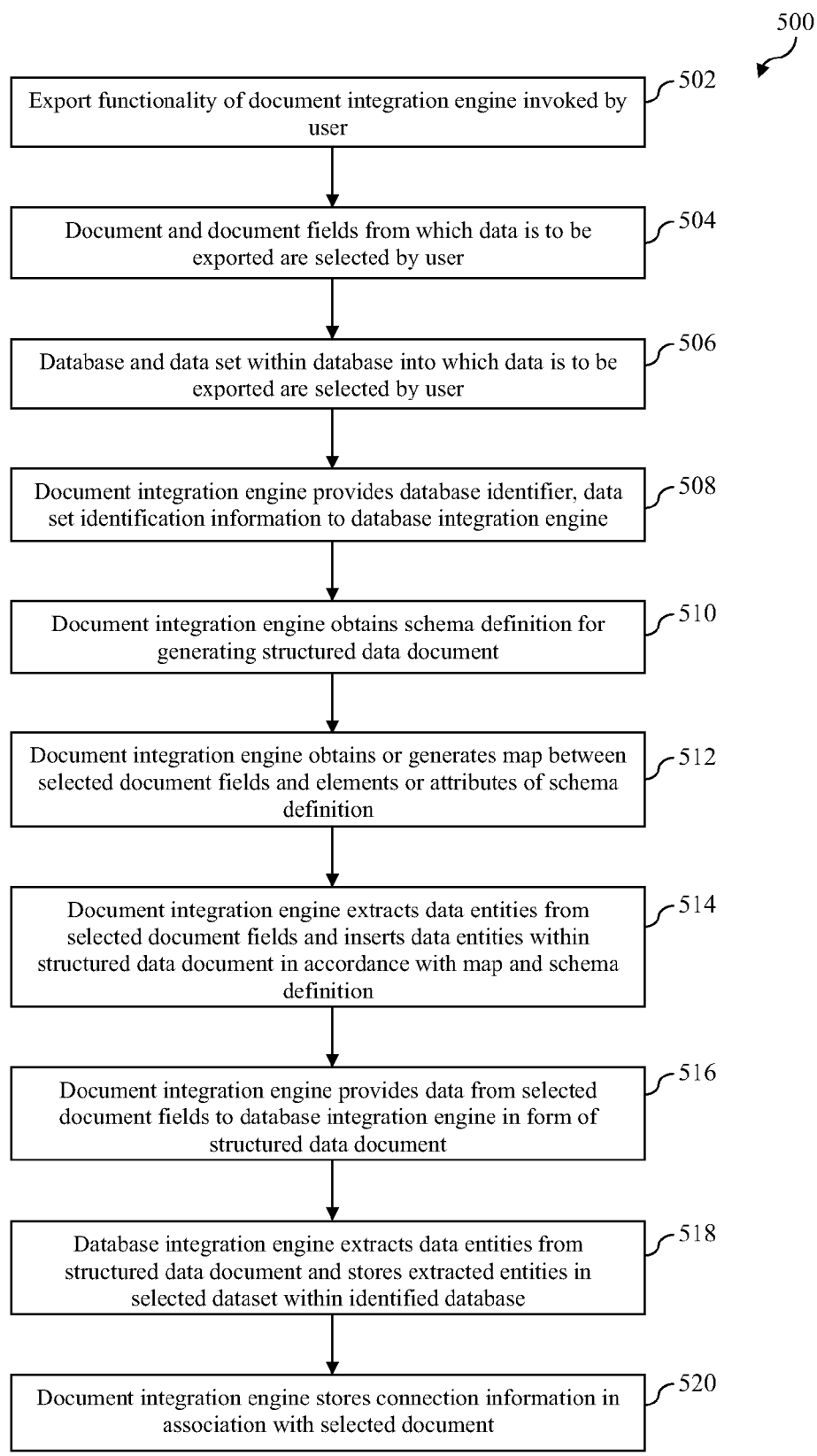
FIG. 5 depicts a flowchart of a method for performing a schema-based export of data from a document application to a data-based application in accordance with an embodiment of the present invention.

As shown in FIG. 5, the method of flowchart 500 begins at step 502 in which export functionality of document integration engine 144 is invoked by a user. The user may invoke the export functionality of document integration engine 144, for example, by interacting with a GUI that is presented to the user by document application 104.

At step 504, a document and document fields from which data is to be exported are selected by the user. The document may be explicitly selected by the user through interaction with export user interface (UI) logic 402, which is part of document integration engine 144 as shown in FIG. 4. For example, the user may interact with GUI elements generated by export UI logic 402 to select the document from which data is to be exported. Alternatively, the document may be implicitly selected by the user through some other user gesture. For example, a document that the user opened or was viewing prior to invoking the export functionality in step 502 may be deemed the selected document. For the remainder of the description of this method, it will be assumed that the user has selected document 142 as the document from which data is to be exported.

The document fields from which data is to be exported may also be explicitly selected by the user. The user may explicitly select such document fields, for example, by identifying one or more cells or tables within document 142 from which data is to be exported in a case where document 142 is a spreadsheet. Alternatively, the user may implicitly select the document fields through some other user gesture. A user may do this, for example, by identifying a template as the source document for export. As noted above, a template is a document associated with document application 104 that has been specially designed for storing data to be transferred to/from a database associated with data-based application 102. In one embodiment, a template includes a predefined notion of which document fields are to be used as a source for export. In a still further embodiment, the document fields from which data is to be exported are selected automatically by document integration engine 144 in accordance with some default setting or user preference.

At step 506, a database and data set within the database into which data is to be exported are identified by the user. In one embodiment, the user selects the database and the target data set through interaction with export UI logic 402 of document integration engine 144. For the remainder of the description of this method, it will be assumed that the user has selected database 122 as the database into which data is to be exported.

In one embodiment in which data-based application 102 is an accounting application such as MICROSOFT OFFICE ACCOUNTING, the user may select the target data set by providing or selecting (1) a company, (2) a master record, document or report list associated with a company, and/or (3) one or more query parameters to be applied. The user may also identify the target data set by specifying certain database fields that are to be included in the export.

In an alternate embodiment, at least a portion of the foregoing information used to select the target data set within database 122 is provided in association with a template selected by the user as the source document for export. For example, the selection of a particular template may dictate the master record, document or report list into which data is to be exported but not the company into which such data is to be exported.

At step 508, document integration engine 144 provides an identifier of the database selected in step 506 and information that identifies the data set selected in step 506 to database integration engine 124. This information may be provided by way of a communication link 404 established between document integration engine 144 and database integration engine 124, as shown in FIG. 4.

At step 510, document integration engine 144 obtains a schema definition 112 for generating a structured data document 114 that will include the data to be exported from document 142. The identity of the appropriate schema definition may be determined by document integration engine 144 based on the selection of a particular source data set by the user in step 506, or based upon the selection of a particular template by the user as the export source document. Alternatively, the identity of the appropriate schema definition may be determined by database integration engine 124 and communicated from database integration engine 124 to document integration engine 144 over communication link 404.

At step 512, document integration engine 144 obtains or generates a map 406 between the source document fields selected in step 504 and elements or attributes of schema definition 112. Map 406 may be generated by a user through interaction with export UI logic 402 in a similar manner to that described in U.S. Pat. No. 7,249,316. Alternatively, map 406 may be dynamically generated by document integration engine 144 during the export process. Once generated, map 406 is stored in association with document 142. In the embodiment shown in FIG. 4, map 406 is embedded within document 142.

In an alternate embodiment, the source document fields may be "pre-mapped" to the elements and attributes of schema definition 112 in an instance where a template is designated as the source document for the export. In this instance, map 406 exists in association with document 142 prior to execution of the export process.

At step 514, document integration engine 144 extracts data entities from the source document fields in document 142 and inserts the extracted data entities within structured data document 114 in accordance with map 406 obtained or generated in step 512 and schema definition 112.

At step 516, document integration engine 144 provides the data from the source document fields within document 142 to database integration engine 124 in the form of structured data document 114.

At step 518, database integration engine 124 extracts data entities from structured data document 114 and stores the extracted entities in the target dataset within database 122. Database integration engine 124 performs this step by mapping between elements and attributes of schema definition 112 and a database schema associated with database 122. Based on this mapping, database integration engine 124 inserts extracted data entities into the target data set within database 122.

At step 520, document integration engine 144 stores connection information 408 used during the export process in association with document 142. In the embodiment shown in FIG. 4, connection information 408 is embedded within document 142. In an embodiment in which document 142 is an EXCEL spreadsheet, the embedding of connection information 408 within document 142 may be achieved, for example, by storing connection information 408 in a very hidden worksheet within document 142.

In an embodiment, connection information 408 includes information sufficient to identify database 122 to which data was exported, the data set within database 122 to which data was exported, and schema definition 112 used to generate structured data document 114. As noted above, the information used to identify the data set within database 122 to which data was exported may include (1) a company, (2) a master record, document or report list associated with a company, and/or (3) one or more query parameters that were applied. As also noted above, the information used to identify the data set may also include certain database fields that were included in the import. An example of elements that may be included in connection information 408 was previously described with reference to Table 1.

3. Export of Data Entities from Data-Based Application

Figure 6:
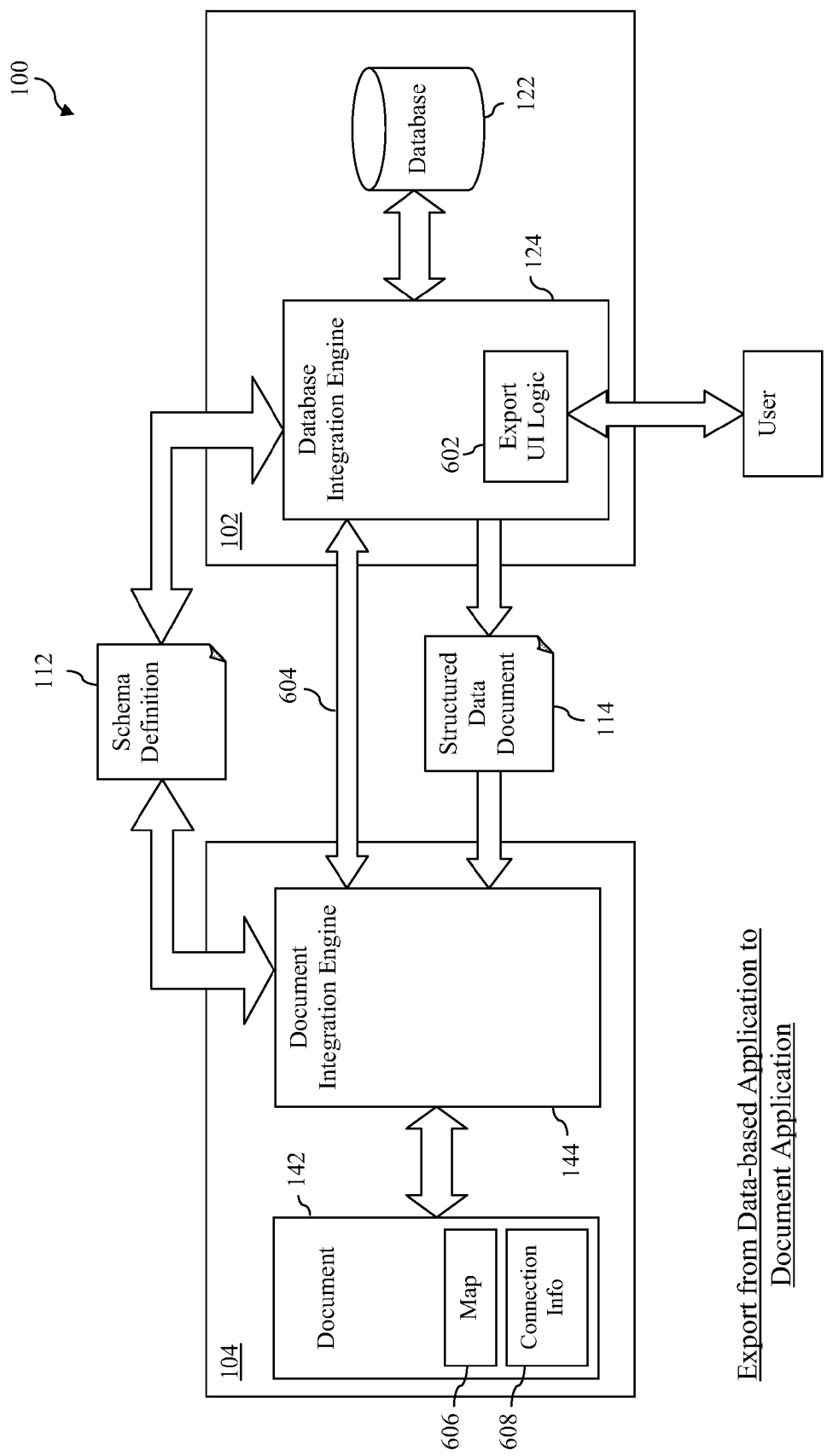
FIG. 6 is a block diagram of a system for performing a schema-based export of data from a data-based application to a document application in accordance with an embodiment of the present invention.

In one scenario, a user exports data entities from a database associated with data-based application 102 into a document associated with document application 104 by invoking export functionality of data-based application 102. FIG. 6 is a block diagram of system 100 that depicts additional implementation details relevant to such a scenario. Steps involved in performing such an import will now be described in reference to flowchart 700 of FIG. 7. The method of flowchart 700 is described herein by way of example only and is not intended to limit the present invention. Furthermore, although the steps of flowchart 700 may be described with reference to various logical and/or physical entities shown in FIG. 6, persons skilled in the relevant art(s) will readily appreciate that the method need not be implemented using such entities.

Figure 7:
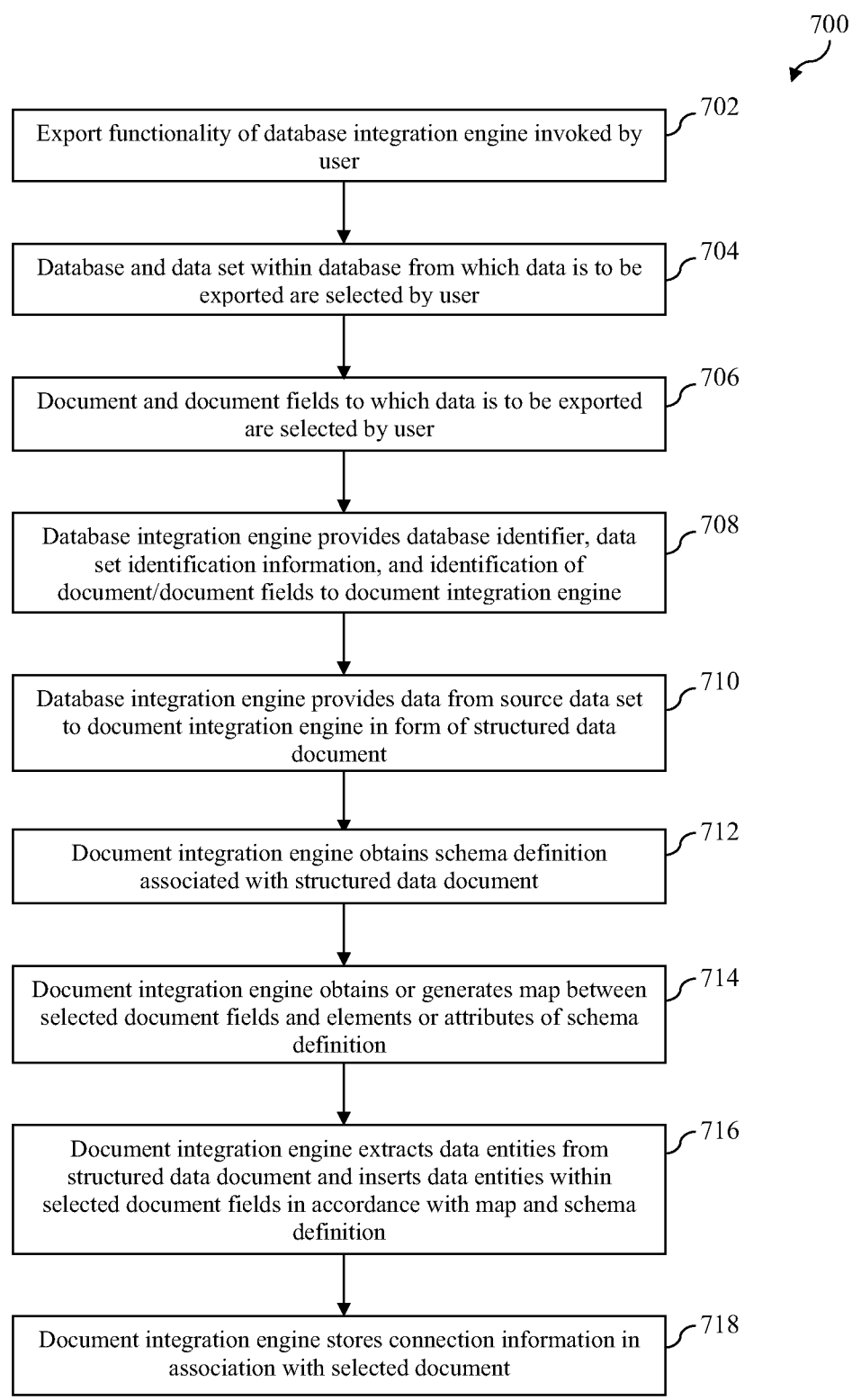
FIG. 7 depicts a flowchart of a method for performing a schema-based export of data from a data-based application to a document application in accordance with an embodiment of the present invention.

As shown in FIG. 7, the method of flowchart 700 begins at step 702 in which export functionality of database integration engine 124 is invoked by a user. The user may invoke the export functionality of database integration engine 124, for example, by interacting with a GUI that is presented to the user by data-based application 102.

At step 704, a database and data set within the database from which data is to be exported are selected by the user. The database may be explicitly selected by the user through interaction with export user interface (UI) logic 602, which is part of database integration engine 124 as shown in FIG. 6. For example, the user may interact with GUI elements generated by export UI logic 602 to select the database from which data is to be exported. Alternatively, the database may be implicitly selected by a user through some other user gesture. For example, a database that the user opened or was viewing prior to invoking the export functionality in step 702 may be deemed the selected database. For the remainder of the description of this method, it will be assumed that the user has selected database 122 as the database from which data is to be exported.

The source data set within database 122 from which data is to be exported may also be explicitly selected by the user. The user may explicitly select the data set, for example, through interaction with export UI logic 602 of database integration engine 124. In one embodiment in which data-based application 102 is an accounting application such as MICROSOFT OFFICE ACCOUNTING, the user may select the source data set by providing or selecting (1) a company, (2) a master record, document or report list associated with a company, and/or (3) one or more query parameters to be applied. The user may also select the source data set by specifying certain database fields that are to be included in the export.

Alternatively, the user may implicitly select the source data set through some other user gesture. For example, a data set that the user opened or was viewing prior to invoking the export functionality in step 702 may be deemed the identified data set. Still further, at least a portion of the information used to select the source data set may be dictated by the choice of a particular template as a target document for export in subsequent step 706. For example, the selection of a particular template may dictate the master record, document or report list from which data is to be exported but not the company from which such data is to be exported.

At step 706, a document and document fields to which data is to be exported are selected by the user. In one embodiment, the user explicitly selects the document through interaction with export UI logic 602 of database integration engine 124. For the remainder of the description of this method, it will be assumed that the user has selected document 142 as the document into which data is to be exported.

The document fields into which data is to be exported may also be explicitly selected by the user. The user may explicitly select such document fields, for example, through interaction with export UI logic 602 of database integration engine 124. Alternatively, the user may implicitly select the document fields through some other user gesture. A user may do this, for example, by selecting a template as the target document for export. In one embodiment, a template includes a predefined notion of which document fields are to be targeted for export. In a still further embodiment, the document fields into which data is to be exported are selected automatically by document integration engine 144 in accordance with some default setting or user preference.

At step 708, database integration engine 124 provides an identifier of the database selected in step 704 and information that identifies the data set selected in step 704 to document integration engine 144. During step 708, database integration engine 124 also provides an identification of the document and document fields to which data will be exported to document integration engine 144. This information may be provided by way of a communication link 604 established between database integration engine 124 and document integration engine 144, as shown in FIG. 6. In an embodiment in which document integration engine 144 determines the target document fields or in which the target document fields are determined by the choice of a particular template as the target document for export, an identification of the target document fields is not passed during step 708.

At step 710, database integration engine 124 provides data from the source data set within database 122 to document integration engine 144 in the form of structured data document 114. To perform this step, database integration engine 124 first extracts data entities from the source data set selected in database 122. Database integration engine 124 also identifies a schema definition that is appropriate for transferring data from the source data set. For the remainder of the description of this method, it will be assumed that schema definition 112 is identified as the schema definition that is appropriate for transferring data from the source data set.

Database integration engine 124 then inserts the data entities extracted from database 122 into a structured data document 114. Database integration engine 124 performs this step by mapping between elements and attributes of a database schema associated with database 122 and elements and attributes of schema definition 112. Based on this mapping, database integration engine 124 inserts extracted data entities into structured data document 114.

At step 712, document integration engine 144 obtains schema definition 112 associated with structured data document 114. An identifier of the appropriate schema definition may be included within structured data document 114. Alternatively, an identifier of the appropriate schema definition may be communicated from database integration engine 124 to document integration engine 144 over communication link 604. Still further, the identity of the appropriate schema definition may be determined by document integration engine 144 based upon the data set identification information provided in step 708, or based upon the identification of a particular template as the export target document in step 708.

At step 714, document integration engine 144 obtains or generates a map 606 between the target document fields identified in step 708 and elements or attributes of schema definition 112. Map 606 may be generated by a user through interaction with export UI logic 602 in a similar manner to that described in U.S. Pat. No. 7,249,316. Alternatively, map 606 may be dynamically generated by document integration engine 144 during the export process. Once generated, map 606 is stored in association with document 142. In the embodiment shown in FIG. 6, map 606 is embedded within document 142.

In an alternate embodiment, the target document fields may be "pre-mapped" to the elements and attributes of schema definition 112 in an instance where a template is designated as the target document for the export. In this instance, map 606 exists in association with document 142 prior to execution of the export process.

At step 716, document integration engine 144 extracts data entities from structured data document 114 and inserts the extracted data entities within the target document fields in accordance with map 606 obtained or generated in step 714 and schema definition 112.

At step 718, document integration engine 144 stores connection information 608 used during the export process in association with document 142. In the embodiment shown in FIG. 6, connection information 608 is embedded within document 142. In an embodiment in which document 142 is an EXCEL spreadsheet, the embedding of connection information 608 within document 142 may be achieved, for example, by storing connection information 608 in a very hidden worksheet within document 142.

In an embodiment, connection information 608 includes information sufficient to identify database 122 from which data was exported, the data set within database 122 from which data was exported, and schema definition 112 used to generate structured data document 114. As noted above, the information used to identify the data set within database 122 from which data was exported may include (1) a company, (2) a master record, document or report list associated with the company, and/or (3) one or more query parameters that were applied. As also noted above, the information used to identify the data set may also include certain database fields that were included in the export. An example of elements that may be included in connection information 608 was previously described with reference to Table 1.

4. Import of Data Entities into Data-Based Application

Figure 8:
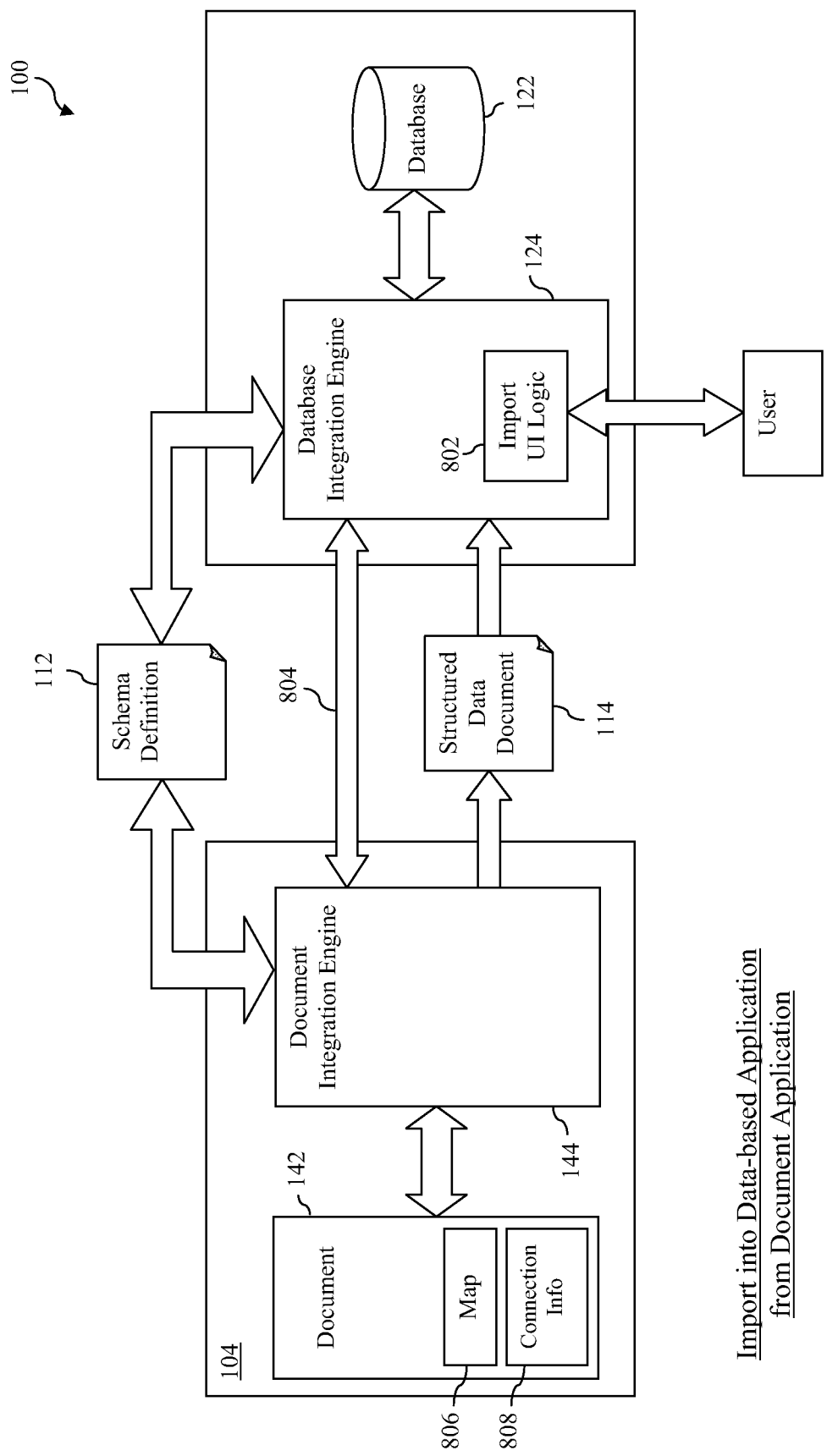
FIG. 8 is a block diagram of a system for performing a schema-based import of data into a data-based application from a document application in accordance with an embodiment of the present invention.

In one scenario, a user imports data entities into a database associated with data-based application 102 from a document associated with document application 104 by invoking import functionality of data-based application 102. FIG. 8 is a block diagram of system 100 that depicts additional implementation details relevant to such a scenario. Steps involved in performing such an import will now be described in reference to flowchart 900 of FIG. 9. The method of flowchart 900 is described herein by way of example only and is not intended to limit the present invention. Furthermore, although the steps of flowchart 900 may be described with reference to various logical and/or physical entities shown in FIG. 8, persons skilled in the relevant art(s) will readily appreciate that the method need not be implemented using such entities.

Figure 9:
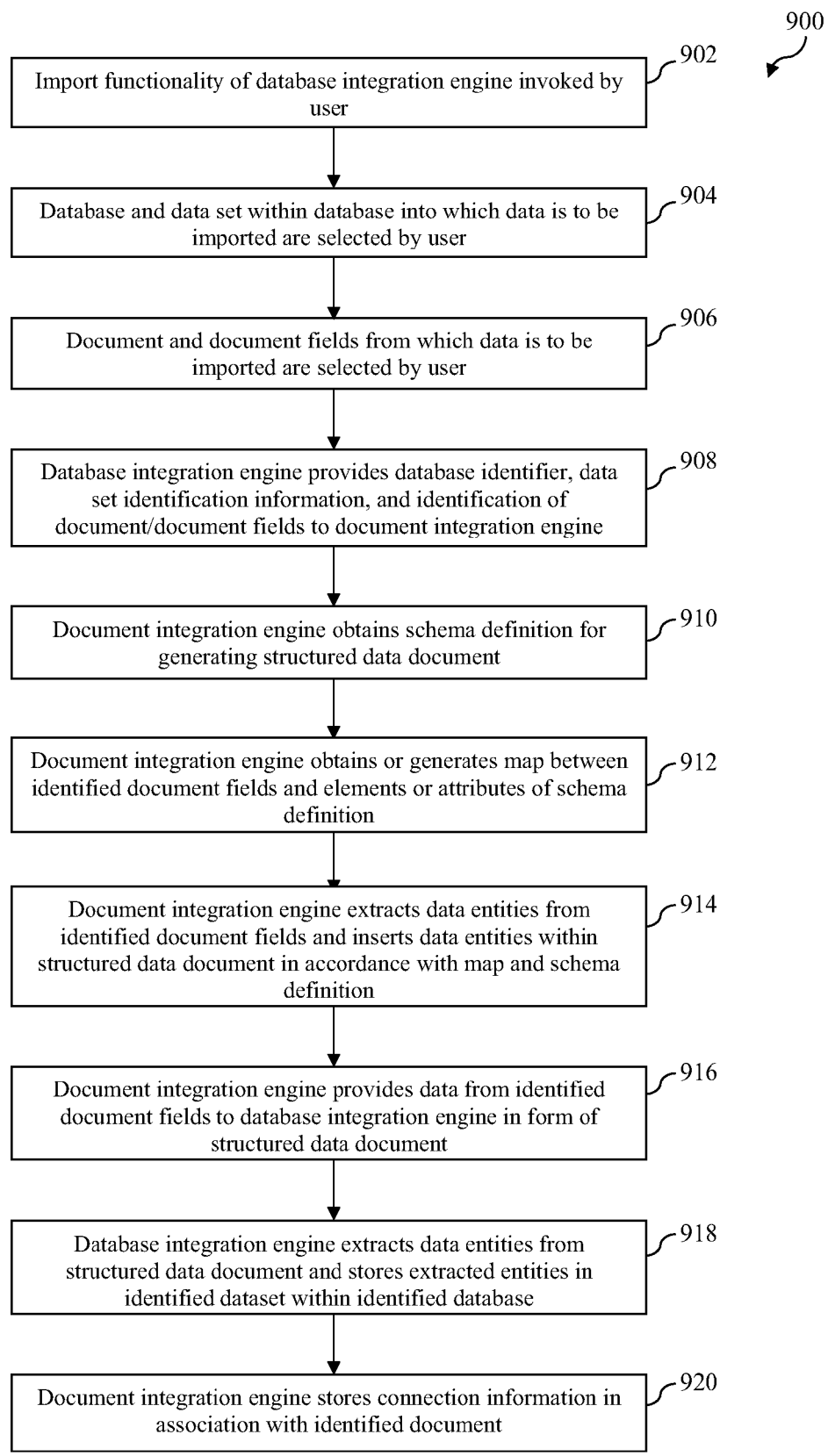
FIG. 9 depicts a flowchart of a method for performing a schema-based import of data into a data-based application from a document application in accordance with an embodiment of the present invention.

As shown in FIG. 9, the method of flowchart 900 begins at step 902 in which import functionality of database integration engine 124 is invoked by a user. The user may invoke the import functionality of database integration engine 124, for example, by interacting with a GUI that is presented to the user by data-based application 102.

At step 904, a database and data set within the database into which data is to be imported are selected by the user. The database may be explicitly selected by the user through interaction with import user interface (UI) logic 802, which is part of database integration engine 124 as shown in FIG. 8. For example, the user may interact with GUI elements generated by import UI logic 802 to select the database into which data is to be imported. Alternatively, the database may be implicitly selected by the user through some other user gesture. For example, a database that the user opened or was viewing prior to invoking the import functionality in step 902 may be deemed the selected database. For the remainder of the description of this method, it will be assumed that the user has selected database 122 as the database into which data is to be imported.

The target data set within database 122 into which data is to be imported may also be explicitly selected by the user. The user may explicitly select the data set, for example, through interaction with import UI logic 802 of database integration engine 124. In one embodiment in which data-based application 102 is an accounting application such as MICROSOFT OFFICE ACCOUNTING, the user may select the target data set by providing or selecting (1) a company, (2) a master record, document or report list associated with a company, and/or (3) one or more query parameters to be applied. The user may also select the target data set by specifying certain database fields that are to be included in the import.

Alternatively, the user may implicitly select the target data set through some other user gesture. For example, a data set that the user opened or was viewing prior to invoking the import functionality in step 902 may be deemed the selected data set. Still further, at least a portion of the information used to select the target data set may be dictated by the choice of a particular template as a source document for import in subsequent step 906. For example, the selection of a particular template may dictate the master record, document or report list into which data is to be imported but not the company into which such data is to be imported.

At step 906, a document and document fields from which data is to be imported are selected by the user. In one embodiment, the user explicitly selects the document through interaction with import UI logic 802 of database integration engine 124. For the remainder of the description of this method, it will be assumed that the user has selected document 142 as the document from which data is to be imported.

The document fields from which data is to be imported may also be explicitly selected by the user. The user may explicitly select such document fields, for example, through interaction with import UI logic 802 of database integration engine 124. Alternatively, the user may implicitly select the document fields through some other user gesture. A user may do this, for example, by selecting a template as the source document for import. In one embodiment, a template includes a predefined notion of which document fields are to be used a source for import. In a still further embodiment, the document fields from which data is to be imported are selected automatically by document integration engine 144 in accordance with some default setting or user preference.

At step 908, database integration engine 124 provides an identifier of the database selected in step 904 and information that identifies the data set selected in step 904 to document integration engine 144. During step 908, database integration engine 124 also provides to document integration engine 144 an identification of the document and document fields from which data will be imported. This information may be provided by way of a communication link 804 established between database integration engine 124 and document integration engine 144, as shown in FIG. 8. In an embodiment in which document integration engine 144 determines the source document fields or in which the source document fields are determined by the choice of a particular template as the source document for import, an identification of the document fields is not passed during step 908.

At step 910, document integration engine 144 obtains a schema definition 112 for generating a structured data document 114 that will include the data to be imported to database 122. The identity of the appropriate schema definition may be determined by document integration engine 144 based on the source data set identification information obtained in step 908, or based upon the selection of a particular template by the user as the import source document. Alternatively, the identity of the appropriate schema definition may be determined by database integration engine 124 and communicated from database integration engine 124 to document integration engine 144 over communication link 804.

At step 912, document integration engine 144 obtains or generates a map 806 between the source document fields identified in step 908 and elements or attributes of schema definition 112. Map 806 may be generated by a user through interaction with import UI logic 802 in a similar manner to that described in U.S. Pat. No. 7,249,316. Alternatively, map 806 may be dynamically generated by document integration engine 144 during the import process. Once generated, map 806 is stored in association with document 142. In the embodiment shown in FIG. 8, map 806 is embedded within document 142.

In an alternate embodiment, the source document fields may be "pre-mapped" to the elements and attributes of schema definition 112 in an instance where a template is designated as the source document for the import. In this instance, map 806 exists in association with document 142 prior to execution of the import process.

At step 914, document integration engine 144 extracts data entities from the source document fields in document 142 and inserts the extracted data entities within structured data document 114 in accordance with map 806 obtained or generated in step 912 and schema definition 112.

At step 916, document integration engine 144 provides the data from the source document fields within document 142 to database integration engine 124 in the form of structured data document 114.

At step 918, database integration engine 124 extracts data entities from structured data document 114 and stores the extracted entities in the target dataset within database 122. Database integration engine 124 performs this step by mapping between elements and attributes of schema definition 112 and a database schema associated with database 122. Based on this mapping, database integration engine 124 inserts extracted data entities into the target data set within database 122.

At step 920, document integration engine 144 stores connection information 808 used during the import process in association with document 142. In the embodiment shown in FIG. 8, connection information 808 is embedded within document 142. In an embodiment in which document 142 is an EXCEL spreadsheet, the embedding of connection information 808 within document 142 may be achieved, for example, by storing connection information 808 in a very hidden worksheet within document 142.

In an embodiment, connection information 808 includes information sufficient to identify database 122 to which data was imported, the data set within database 122 to which data was imported, and schema definition 112 used to generate structured data document 114. As noted above, the information used to identify the data set within database 122 to which data was imported may include (1) a company, (2) a master record, document or report list associated with a company, and/or (3) one or more query parameters that were applied. As also noted above, the information used to identify the data set may also include certain database fields that were included in the import. An example of elements that may be included in connection information 808 was previously described with reference to Table 1.

C. Subsequent Document and Database Updates Based on Connection Information

In each of the above-described data transfer scenarios, after data has been transferred between document fields of a selected document and a data set within a selected database, connection information associated with the data transfer is stored in association with the selected document. As will be described in this section, an embodiment of the present invention uses such stored connection information to facilitate subsequent updates of the document fields based on the latest data stored in the associated data set and subsequent updates of the data set based on the latest data stored in the associated document fields. Such updates may be performed in a manner that is highly automated, reliable and easily managed by a user.

The functionality described in this section may be used, for example, to enable a user to easily refresh data entities that were previously imported from a database associated with data-based application 102 into a report associated with document application 104 with the most current version of such data entities stored in the database. This allows a user to easily generate updated versions of the report. The functionality described in this section may also be used to enable a user to edit data entities that were previously imported from a database associated with data-based application 102 into a document associated with document application 104 within the context of the document and then to update the database based on such edited data.

In this section, a process by which the connection information is used to facilitate an update of a data set in a database associated with data-based application 102 based on associated document fields of a document associated with document application 104 will first be described. Then a process by which the connection information is used to facilitate an update of document fields in a document associated with document application 104 based on an associated data set in a database associated with data-based application 104 will be described. Finally, a synchronization process that combines both of the foregoing processes will be described.

1. Subsequent Database Update Based on Connection Information

Figure 10:
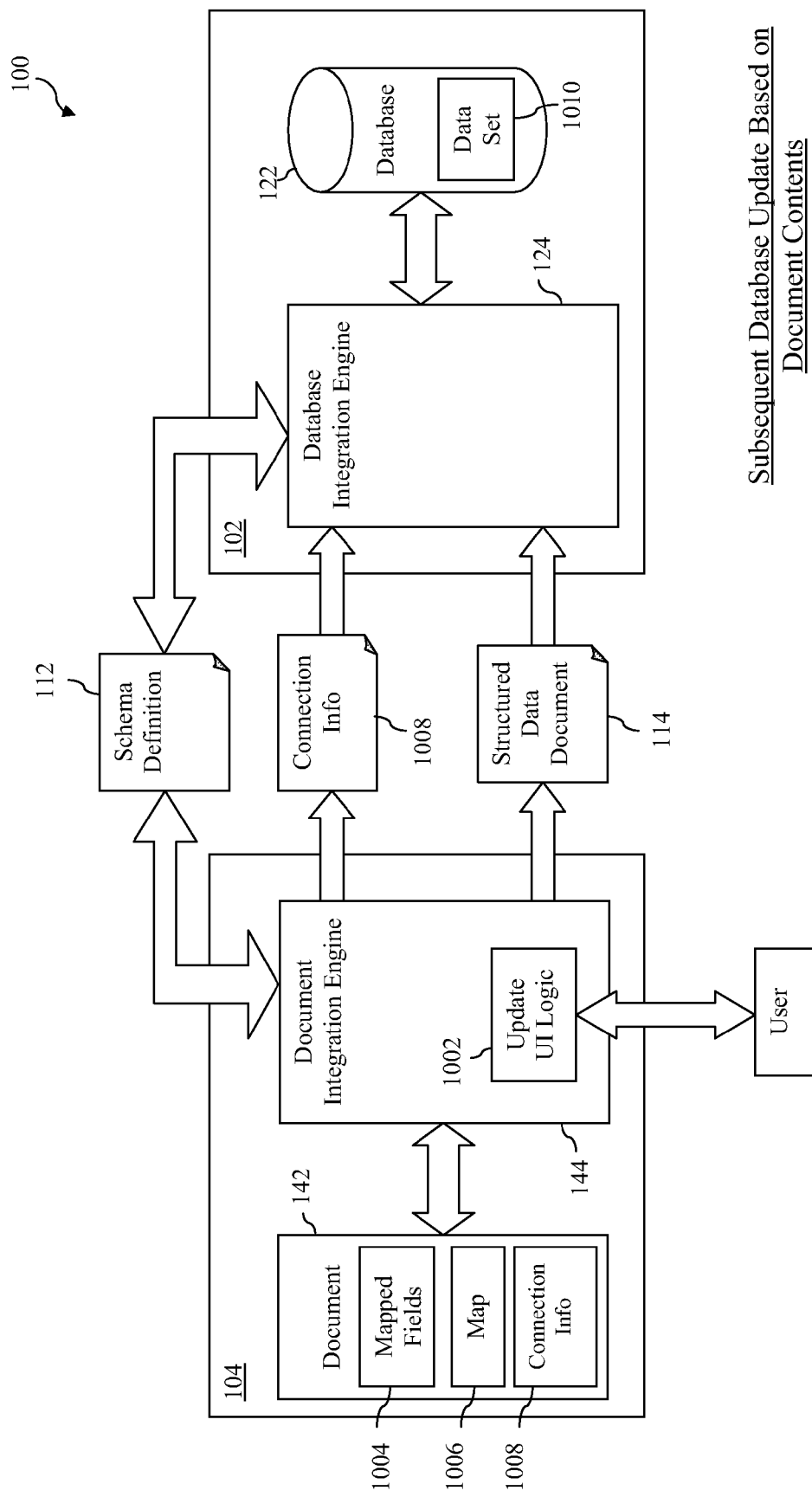
FIG. 10 is a block diagram of a system for updating a database associated with a data-based application based on a document associated with a document application based on pre-existing connection information in accordance with an embodiment of the present invention.

A process by which a user updates a dataset in a database associated with data-based application 102 based on associated document fields of a document associated with document application 104 based on pre-existing connection information will now be described. FIG. 10 is a block diagram of system 100 that depicts additional implementation details relevant to the execution of such a process. Steps involved in performing such a process will now be described in reference to flowchart 1100 of FIG. 11. The method of flowchart 1100 is described herein by way of example only and is not intended to limit the present invention. Furthermore, although the steps of flowchart 1100 may be described with reference to various logical and/or physical entities shown in FIG. 10, persons skilled in the relevant art(s) will readily appreciate that the method need not be implemented using such entities.

Figure 11:
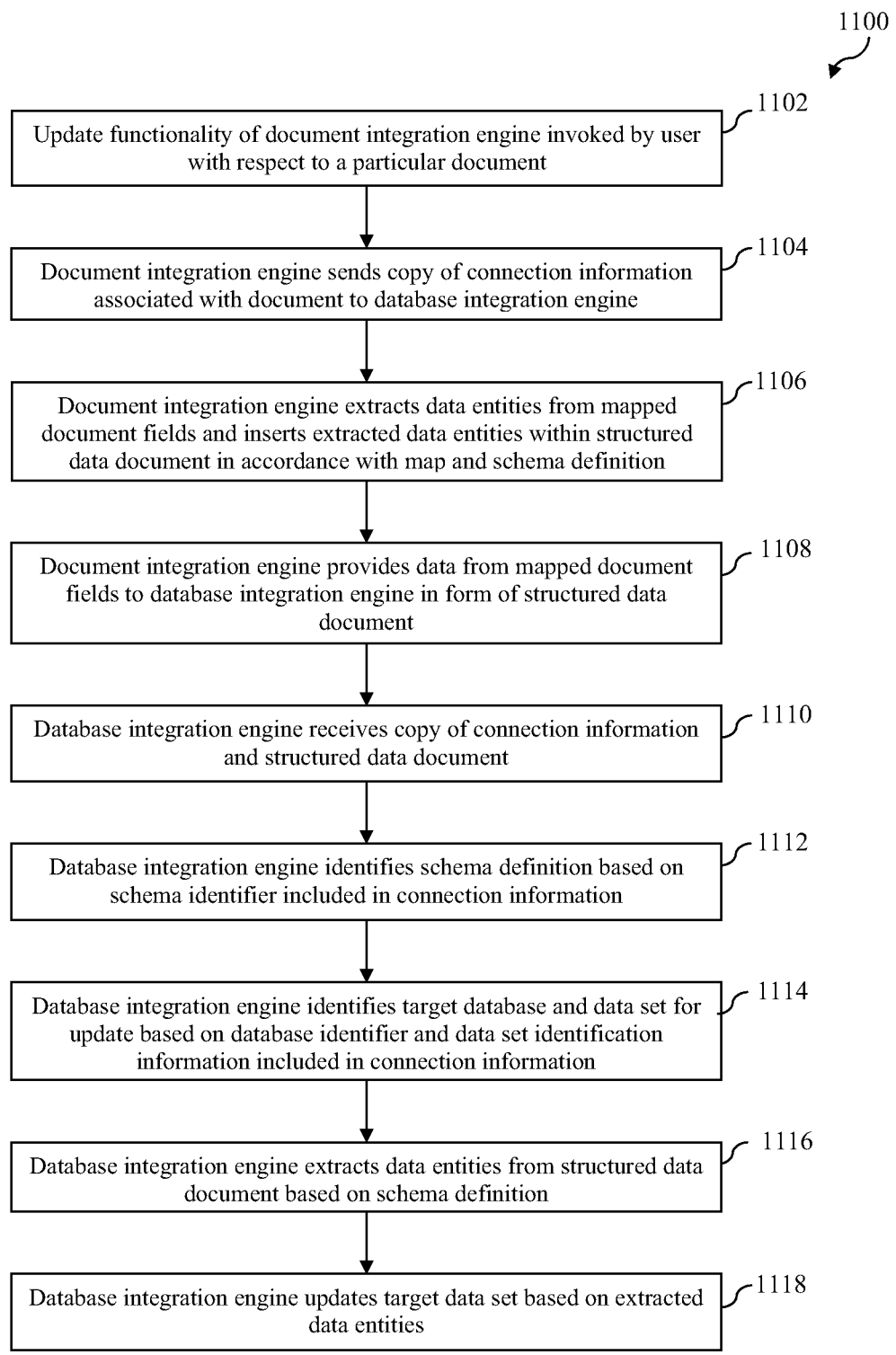
FIG. 11 depicts a flowchart of a method for updating a database associated with a data-based application based on a document associated with a document application based on pre-existing connection information in accordance with an embodiment of the present invention.

As shown in FIG. 11, the method of flowchart 1100 begins at step 1102 in which update functionality of document integration engine 144 is invoked by a user with respect to a particular document, wherein the particular document is a document into which data from a database associated with data-based application 102 was previously transferred or from which data was previously transferred to a database associated with data-based application 102. The transfer may have occurred in accordance with any of the import/export scenarios described above in Section B. For the remainder of the description of this method, it will be assumed that the document for which the update functionality is invoked is document 142.

The user may invoke the update functionality of document integration engine 144, for example, by interacting with a GUI that is presented to the user by update UI logic 1002 of document integration engine 144. The user may also select the relevant document for update through interaction with the same GUI. The selection may also be made implicitly by the user through some other user gesture. For example, a document that the user opened or was viewing prior to invoking the update functionality may be deemed the relevant document for update.

At step 1104, document integration engine 144 sends a copy of connection information 1008 stored in association with document 142 during a previous import/export process to database integration engine 124.

At step 1106, document integration engine 144 extracts data entities currently stored in mapped document fields 1004 within document 142 and inserts the extracted data entities within a structured data document 114 in accordance with a map 1006 and schema definition 112. As discussed in a previous section, map 1006 may be associated with document 142 by virtue of a prior data transfer between document 142 and a database associated with data-based application 102 or by virtue of the fact that document 142 is a template. Document integration engine 144 may determine the appropriate schema definition based on a schema identifier stored as part of connection information 1008.

At step 1108, document integration engine 144 provides data from mapped document fields 1004 to database integration engine 124 in the form of structured data document 114.

At step 1110, database integration engine 124 receives the copy of connection information 1008 that was transferred from document integration engine 144 during step 1104 and structured data document 114 that was transferred from document integration engine 144 during step 1108.

At step 1112, database integration engine 124 identifies schema definition 112 based on a schema identifier included in connection information 1008.

At step 1114, database integration engine 124 identifies a target database 122 and a data set 1010 for update based respectively on a database identifier and data set identification information included in connection information 1008. As discussed elsewhere herein, the data set identification information may include (1) a company, (2) a master record, document or report list associated with a company, and/or (3) one or more query parameters. Database integration engine 124 may identify data set 1010 by accessing the identified list for the appropriate company then running a query against the list based on the query parameter(s). As also discussed elsewhere herein, the data set identification information may also include an identification of certain database fields. Database integration engine 124 may be configured to include only the identified database fields in the update.

At step 1116, database integration engine 124 extracts data entities from structured data document 114 based on schema definition 112.

At step 1118, database integration engine 124 updates target data set 1010 based on the extracted data entities from step 116. Database integration engine 124 performs this step by determining an element/attribute type of schema definition 112 that applies to each extracted data entity and then mapping the element/attribute type to a database schema associated with database 122. Because this is an update operation, the contents of data set 1010 are overwritten by the extracted data entities.

In one embodiment, to ensure the integrity of database 122, database integration engine 124 is configured to perform a number of checks prior to allowing an update to occur. For example, in one embodiment, database integration engine 124 determines whether the schema definition previously used to transfer data between mapped document fields 1004 and data set 1010 (which may be denoted by a schema identifier included in connection information 1008) is the same as a schema definition currently associated with data set 1010. Schema definitions associated with data sets may change, for example, in an embodiment in which database integration engine 124 dynamically generates schema definitions based on a data entity map associated with database 122. So, for example, is a user adds a user-defined field to database 122, database integration engine 124 may generate a new schema definition that encompasses the new user-defined field.

To detect a schema definition mismatch, database integration engine 124 may be configured to compare a schema version number stored as part of connection information 1008 with a schema version number currently associated with data set 1010. Alternatively, database integration engine 124 may be configured to directly compare a schema definition identified by a schema identifier stored as part of connection information 1008 with a schema definition currently associated with data set 1010.

If database integration engine 124 detects a schema definition mismatch, a variety of actions may be performed depending upon the implementation. For example, responsive to the detection of such a mismatch by database integration engine 124, document integration engine 144 may require a user to update map 1006 to account for the schema definition discrepancy (for example, by mapping one or more new fields or un-mapping one or more existing fields) and then to refresh the data stored in document 142 using a process that will be described in Section C.2 below.

Note that in one embodiment, database integration engine 124 may also be configured to detect a schema definition mismatch during an import process such as that described above in Sections B.2 and B.4 above. This may be useful for example, if the document from which data is being imported is a template and thus is already associated with a particular schema definition that may or may not match the schema definition being used for the import. Another check that may be performed by database integration engine 124 prior to performing the update of step 1118 involves matching primary keys associated with database rows being transferred from document 142 with primary keys stored as part of connection information 1008. In one embodiment of the present invention, a primary key associated with each database row previously transferred between data set 1010 and mapped document fields 1004 is stored as part of connection information 1008. Prior to update, the primary keys associated with the database rows being transferred from document 142 may be compared to the primary keys stored in connection information 1008 for the purpose of performing error checking and facilitating the update operation.

In one implementation, if a primary key stored in connection information 1008 does not match any of the primary keys associated with the database rows currently being transferred from document 142, then the update is aborted due to error. This is because a user may have altered or deleted a primary key in document 142. In a further implementation, if a primary key stored in connection information 1008 matches a primary key associated with a database row currently being transferred from document 142, then that database row may be used for update. In a still further implementation, if a primary key associated with a database row currently being transferred from document 142 is blank (or in an alternative approach, does not match a primary key stored in connection information 1008), then a new database row will be added to database 122.

In another embodiment of the present invention, in addition to requiring a primary key match before allowing a row being transferred from document 142 to be used for update, database integration engine 124 also checks to determine whether or not the row in question has been changed relative to a corresponding row in database 122. In such an embodiment, only rows that have been changed are updated. This serves to improve the overall efficiency of the update process.

In one embodiment, the process of determining whether or not a row has been changed is performed by simply comparing each data entity in the row being transferred from document 142 to each corresponding data entity in a corresponding row in database 122. Only the data values that have changed are then updated.

In an alternate embodiment, the process of determining whether or not a row has been changed is performed by calculating a checksum based on the contents of the row being transferred from document 142 and then comparing the calculated checksum to a checksum stored in connection information 1008 in association with the row's primary key, wherein the checksum stored in connection information 1008 was calculated based on the contents of the row during a previous data transfer. The storage of checksum values as part of connection information associated with an import/export operation was previously described in reference to Table 1. If the checksums are different, then at least one data entity in the row has changed.

2. Subsequent Document Update ("Refresh") Based on Connection Information

Figure 12:
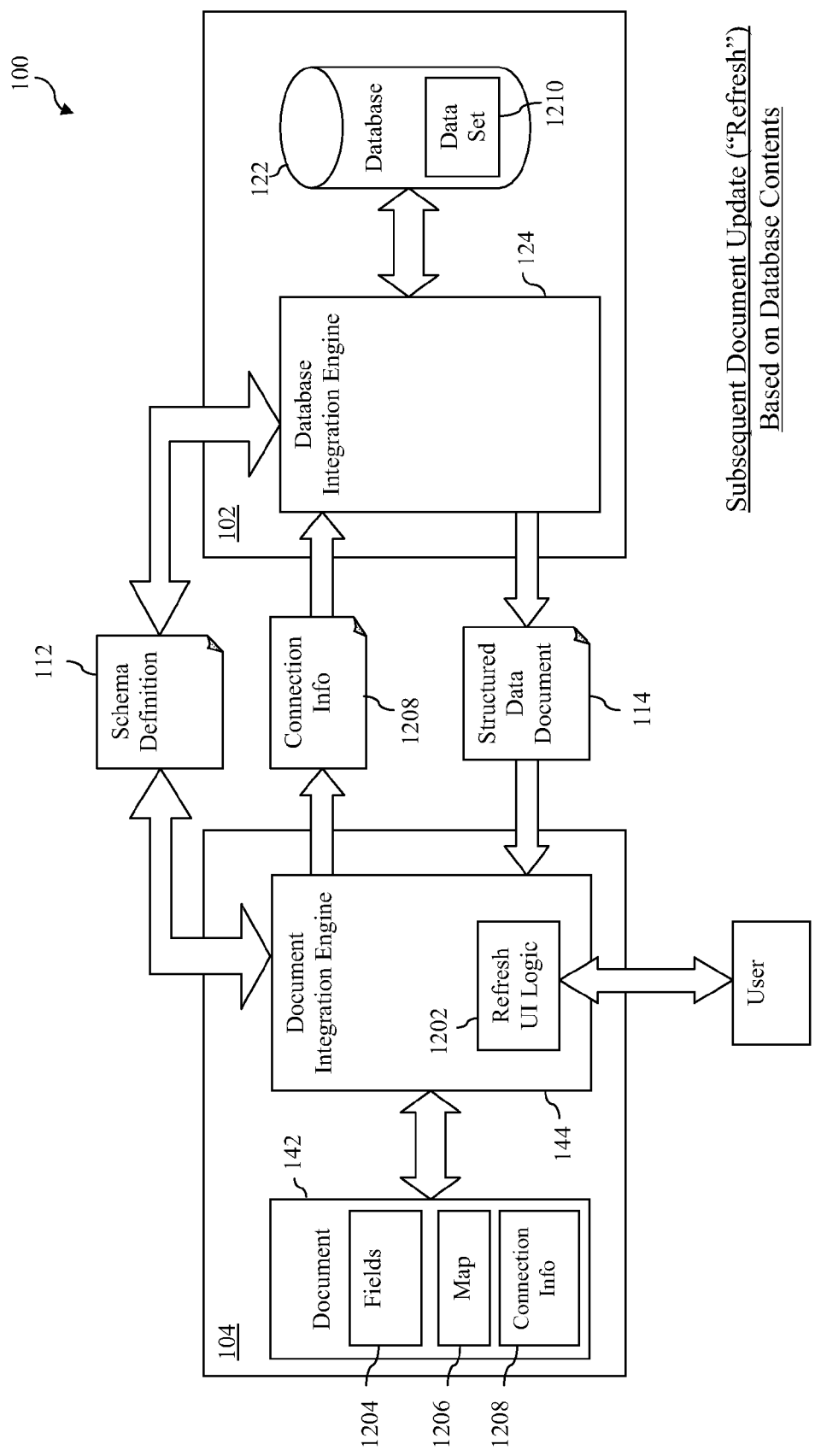
FIG. 12 is a block diagram of a system for refreshing a document associated with a document application based on a database associated with a data-based application based on pre-existing connection information in accordance with an embodiment of the present invention.

A process by which a user updates or refreshes a set of fields in a document associated with document application 104 based on an associated dataset in a database associated with data-based application 102 based on pre-existing connection information will now be described. FIG. 12 is a block diagram of system 100 that depicts additional implementation details relevant to the execution of such a process. Steps involved in performing such a process will now be described in reference to flowchart 1300 of FIG. 13. The method of flowchart 1300 is described herein by way of example only and is not intended to limit the present invention. Furthermore, although the steps of flowchart 1300 may be described with reference to various logical and/or physical entities shown in FIG. 12, persons skilled in the relevant art(s) will readily appreciate that the method need not be implemented using such entities.

Figure 13:
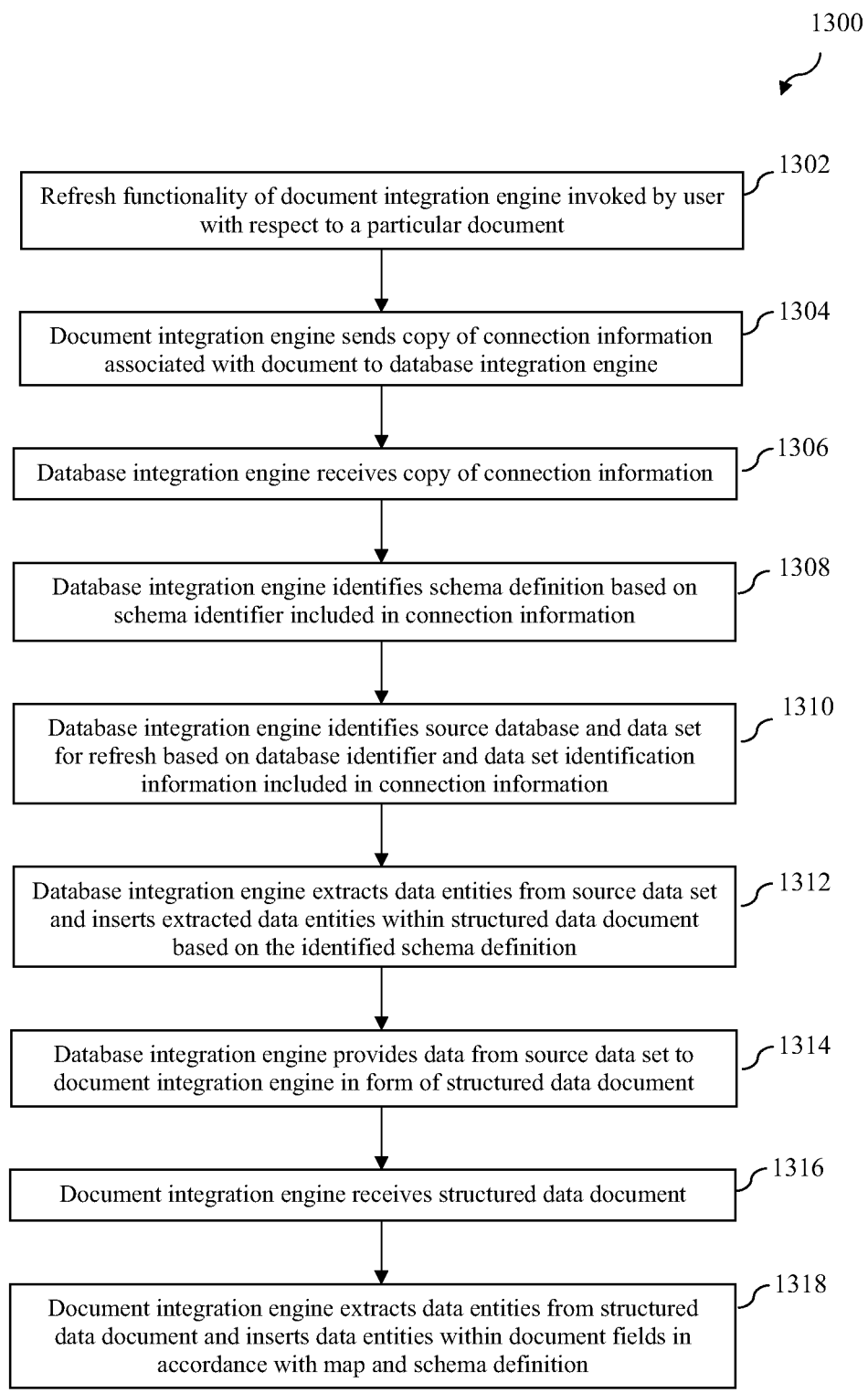
FIG. 13 depicts a flowchart of a method for refreshing a document associated with a document application based on a database associated with a data-based application based on pre-existing connection information in accordance with an embodiment of the present invention.

As shown in FIG. 13, the method of flowchart 1300 begins at step 1302 in which refresh functionality of document integration engine 144 is invoked by a user with respect to a particular document, wherein the particular document is a document into which data from a database associated with data-based application 102 was previously transferred or from which data was previously transferred to a database associated with data-based application 102. The transfer may have occurred in accordance with any of the import/export scenarios described above in Section B. For the remainder of the description of this method, it will be assumed that the document for which the refresh functionality is invoked is document 142.

The user may invoke the refresh functionality of document integration engine 144, for example, by interacting with a GUI that is presented to the user by refresh UI logic 1202 of document integration engine 144. The user may also select the relevant document for refresh through interaction with the GUI presented by refresh UI logic 1202. The selection may also be made implicitly by the user through some other user gesture. For example, a document that the user opened or was viewing prior to invoking the refresh functionality may be deemed the relevant document for refresh.

At step 1304, document integration engine 144 sends a copy of connection information 1208 stored in association with document 142 during a previous import/export process to database integration engine 124.

At step 1306, database integration engine 124 receives the copy of connection information 1208 that was transferred from document integration engine 144 during step 1304.

At step 1308, database integration engine 124 identifies schema definition 112 based on a schema identifier included in connection information 1008.

At step 1310, database integration engine 124 identifies a source database 122 and a data set 1210 for refresh based respectively on a database identifier and data set identification information included in connection information 1008. As discussed elsewhere herein, the data set identification information may include (1) a company, (2) a master record, document or report list associated with a company, and/or (3) one or more query parameters. Database integration engine 124 may identify data set 1210 by accessing the identified list for the appropriate company then running a query against the list based on the query parameter(s). As also discussed elsewhere herein, the data set identification information may also include an identification of certain database fields. Database integration engine 124 may be configured to include only the identified database fields in the refresh.

At step 1312, database integration engine 124 extracts data entities from source data set 1210 and inserts the extracted data entities within structured data document 114 based on the schema definition 112. Database integration engine 124 performs this step in part by mapping between a database schema associated with database 122 and the elements/attributes of schema definition 112.

At step 1314, database integration engine 124 provides data from source data set 1210 to document integration engine 144 in form of structured data document 114 and at step 1316, document integration engine 144 receives structured data document 114.

At step 1318, document integration engine 144 extracts data entities from structured data document 114 and inserts the extracted data entities within mapped document fields 1204 within document 142 in accordance with map 1206 and schema definition 112, thereby overwriting the values previously stored in those document fields. As discussed in a previous section, map 1206 may be associated with document 142 by virtue of a prior data transfer between document 142 and database 122 or by virtue of the fact that document 142 is a template. Document integration engine 144 may determine the appropriate schema definition based on a schema identifier stored as part of connection information 1208.

3. Subsequent Database and Document Synchronization Based on Connection Information For purposes of ensuring complete consistency between data entities represented in both a database associated with a data-based application 102 and a document associated with document application 104, an embodiment of the present invention may implement a synchronize operation that is essentially a combination of the update operation described above in Section C.2 and the refresh operation described above in Section C.3.

Figure 14:
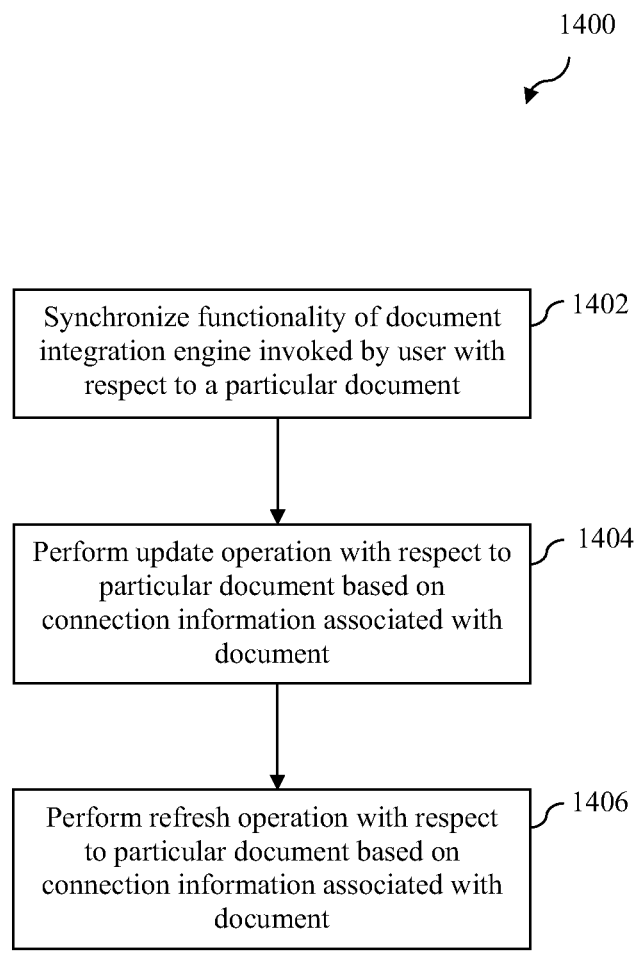
FIG. 14 depicts a flowchart of a method for synchronizing a database associated with a data-based application and a document associated with a document application based on pre-existing connection information in accordance with an embodiment of the present invention.

FIG. 14 depicts a flowchart 1400 of a method for performing such a synchronization process. As shown in FIG. 14, the method of flowchart 1400 begins at step 1402, in a which a user invokes synchronization functionality of document integration engine 144 with respect to a particular document, wherein the particular document is a document into which data from a database associated with data-based application 102 was previously transferred or from which data was previously transferred to a database associated with data-based application 102. At step 1404, an update process is performed with respect to the particular document based on connection information associated with the particular document in a like manner to that described above in Section C.1. At step 1406, a refresh process is performed with respect to the particular document based on connection information associated with the particular document in a like manner to that described above in Section C.2.

D. Use of Templates for Schema-Based Data Transfer Between Data-Based Application and Document Application As previously noted, the term "template" refers to a document associated with a document application that has been specially designed for inputting, editing or viewing data to be transferred to/from a database associated with a data-based application. As will be described in this section, such templates may be made available to a user so that the user can easily export various data entities out of the database for display, editing, or report generation as well as to import new or edited data entities into the database. In one embodiment, the templates may comprise fixed or user-customizable reports that are easily populated with data entities exported from the database and/or that present data and graphics derived from such data entities. As will also be described in this section, in a further embodiment, the templates may be created during an initial data transfer between a first document and the database and then saved for use in performing subsequent data transfers between other documents and the database.

Figure 15:
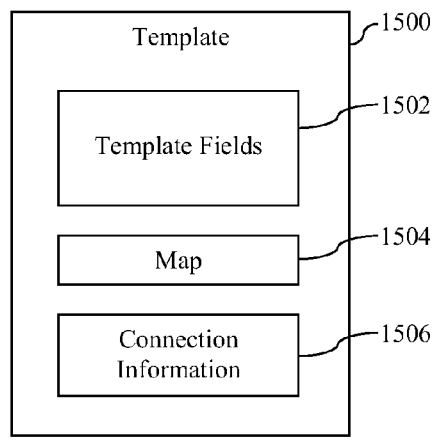
FIG. 15 is a block diagram of an example template associated with a document application that may be used to facilitate a schema-based data transfer into or out of a database associated with a data-based application in accordance with one embodiment of the present invention.

FIG. 15 is a block diagram of an example template 1500 that may be made available to a user in accordance with one embodiment of the present invention. Template 1500 may comprise a type of document associated with a document application, including but not limited to MICROSOFT WORD, MICROSOFT EXCEL, or MICROSOFT OFFICE INFOPATH, although these examples are not intended to be limiting. As shown in FIG. 15, template 1500 includes a number of elements including plurality of template fields 1502, a map 1504 and connection information 1506.

Template fields 1502 are fields that may be populated with data entities by a user for import into a database associated with a data-based application and/or that may be populated with data entities by virtue of an export of data from such a database. In an embodiment in which template 1500 is a spreadsheet associated with a spreadsheet application, template fields 1502 may comprise for example, certain cells within the spreadsheet. In an embodiment in which template 1500 is a word-processing document associated with a word processing application, template fields 1502 may comprise certain predefined fields within the document. In an export scenario, template fields 1502 may actually be hidden from a user but nevertheless used to derive data or graphics that are presented to the user within the context of template 1500.

Depending upon the implementation of template 1500, template fields 1502 may be used to import data into a database associated with a data-based application only, to export data from a database associated with a data-based application only, or to either import or export data into or out of a database associated with a data-based application depending upon the functionality invoked by the user. In an embodiment in which imports are supported, a user is able to enter data entities into template fields 1502 and to edit such data entities. In an embodiment in which only exports or supported, a user may be barred from entering or editing data exported into template fields 1502.

Map 1504 is a set of information that maps each of template fields 1502 to elements or attributes of a schema definition that will be used for performing database import and/or export operations based on template 1500. As shown in FIG. 15, map 1504 is stored within template 1500. For example, in an embodiment in which template 1500 is a spreadsheet, map 1504 may be stored within the spreadsheet through the storage of markers known as XPATHs in the spreadsheet as described in U.S. Pat. No. 7,249,316 to Collie et al., although this example is not intended to be limiting. In an alternate implementation, map 1504 is not stored within template 1500 but is instead stored in association with template 1500.

Connection information 1506 includes information that identifies a data set within a database associated with a data-based application into which data entities entered into template fields 1502 can be imported and/or from which data entities can be exported for insertion into template fields 1502. In an embodiment in which the data-based application is an accounting application such as MICROSOFT OFFICE ACCOUNTING, such data set identification information may include an identification of a master record, document, or report list within a database, as well as one or more query parameters. Such data set identification information may include an identification of one or more database fields. In one embodiment, the data set identification includes more information than is necessary to identify the relevant data set and such irrelevant information is removed by error handling logic. Connection information 1506 also comprises information that identifies the schema definition that will be used for performing database import and/or export operations based on template 1500.

As shown in FIG. 15, connection information 1506 is stored within template 1500. For example, in one embodiment in which template 1500 comprises an EXCEL workbook, connection information 1506 may be stored within a "very hidden sheet" of the EXCEL workbook. In an alternate implementation, connection information 1506 is not stored within template 1500 but is instead stored in association with template 1500.

As will be made evident by the following description, the pre-existing association of map 1504 and connection information 1506 with template fields 1502 enables template 1500 to be used for performing highly-automated, reliable and user-friendly imports and/or exports of data into an out of a database associated with a data-based application. Furthermore, because template 1500 is associated with a document application, it may advantageously support certain data-entry, editing, formatting, printing, and display functions associated with the document application that may not be available to a user via the data-based application. Thus, template 1500 may be thought of as extending the functionality of the data-based application.

Figure 16:
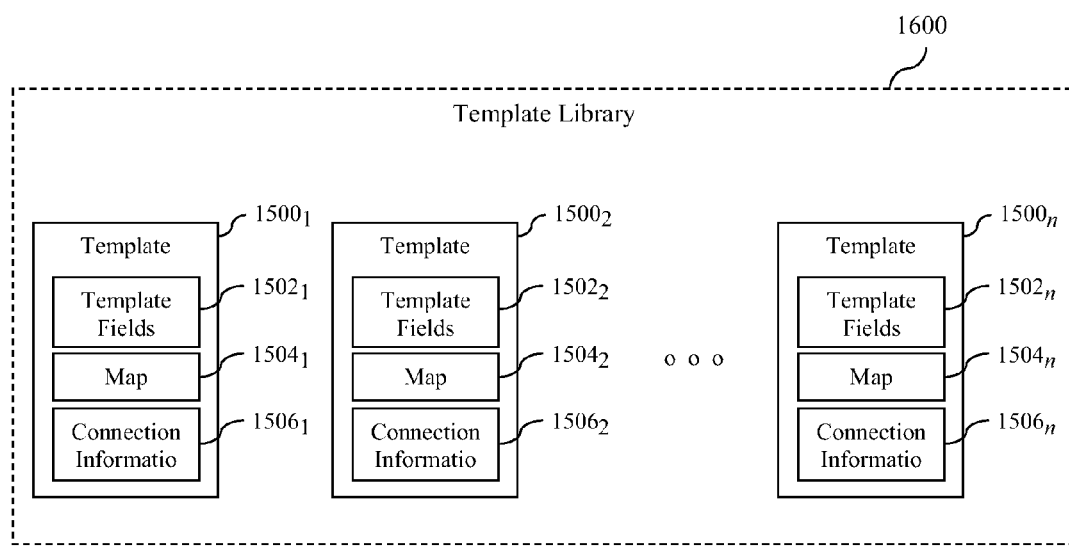
FIG. 16 is a block diagram of a library of templates that may be made available to a user in accordance with an embodiment of the present invention.

In one embodiment of the present invention, a number of different templates are made available to a user for performing database imports and/or exports. For example, as shown in FIG. 16, a plurality of different templates $1500_1$, $1500_2$, ..., $1500_n$ may be made available to a user as part of a template library 1600, wherein each template includes a corresponding set of template fields, map and connection information. Such templates may vary, for example, in terms of the associated data set targeted for import or export, in terms of which data entities are represented by the template fields, and/or in terms of how such data entities or other information is displayed by the template.

Templates may be designed and made available by a publisher of the document application and/or the database application with which such templates are associated or by some other entity. These templates may be loaded into the memory of a user's computer system at the time the document application or database application are installed on the system (e.g., the templates may be bundled with the files used for application install) or may be subsequently downloaded to the computer system by a user over a network, such as a local area or wide area network. Still further, the templates may be stored on a remote server and accessed and manipulated by the user over a network using well-known network communication protocols.

The next sub-section will provide an example of how a template may be used to import data into a database associated with a data-based application. The following sub-section will provide an example of how a template may be used to export data from a database associated with a data-based application. Finally, a subsequent sub-section will provide an example of how a template may be created during an initial data transfer between a first document associated with a document application and a database associated with a data-based application and then saved by a user for use for performing subsequent data transfers between other documents and the database.

Figure 17:
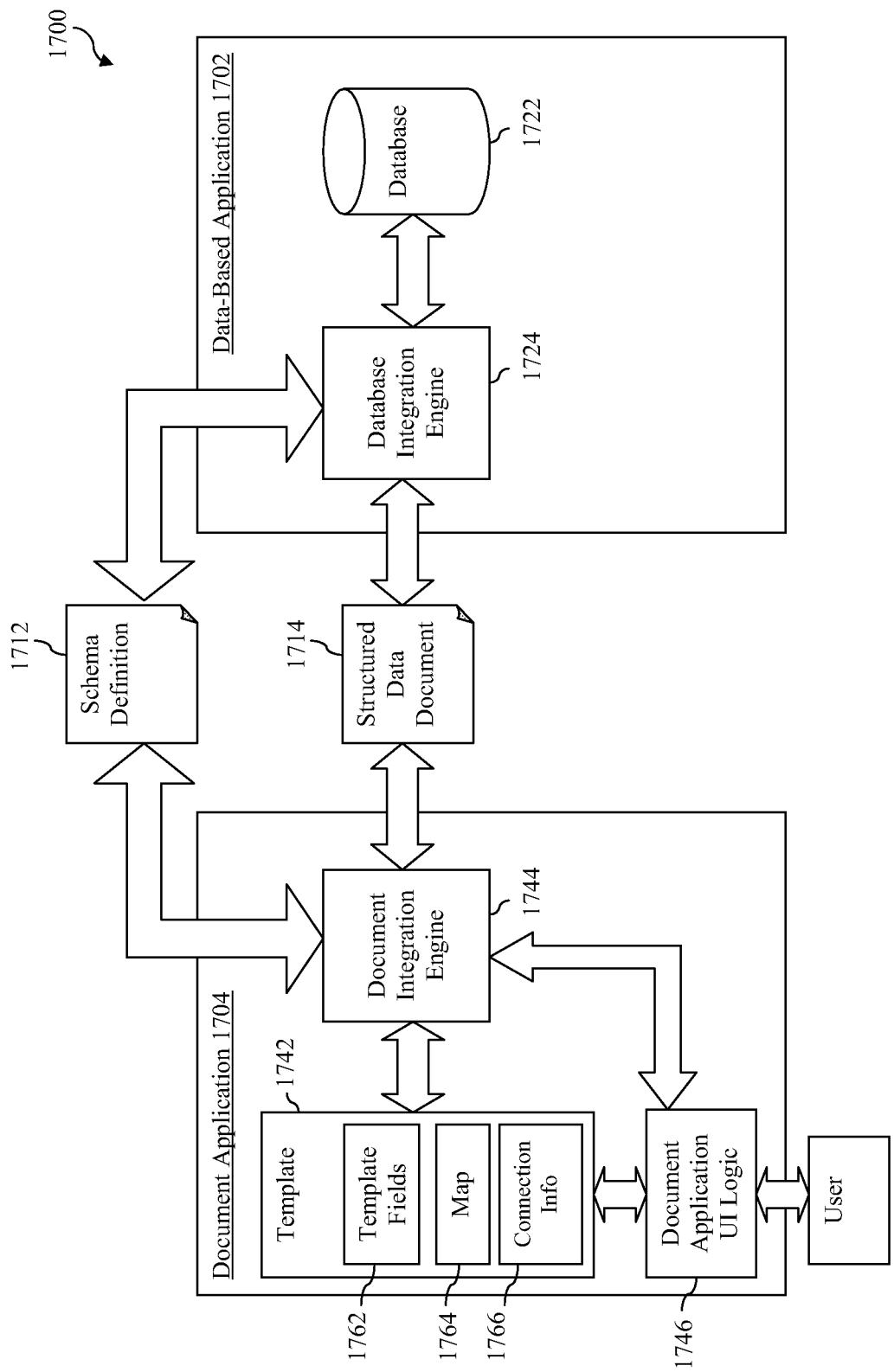
FIG. 17 is a block diagram of a system configured to import data into or export data out of a database associated with a data-based application using a template associated with a document application in accordance with an embodiment of the present invention.
Figure 18:
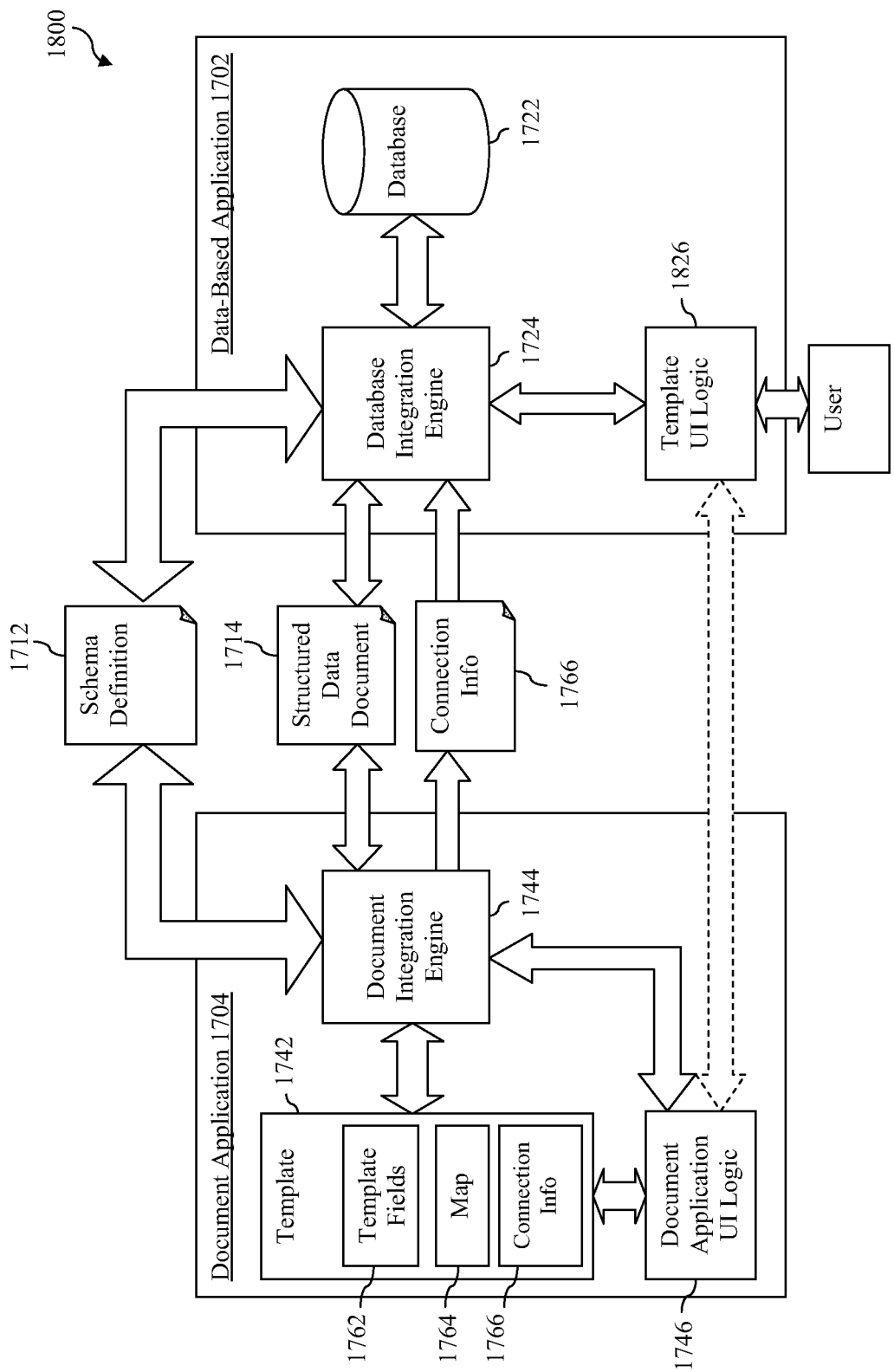
FIG. 18 is a block diagram of an alternate system configured to import data into or export data out of a database associated with a data-based application using a template associated with a document application in accordance with an embodiment of the present invention.

1. Use of Templates for Import into a Database Associated with a Data-Based Application A process by which a user uses a template associated with a document application to import data into a database associated with a data-based application will now be described. FIG. 17 is a block diagram of a system 1700 that may be used to perform such a process. As shown in FIG. 17, system 1700 includes a data-based application 1702 and a document application 1704, which are analogous to data-based application 102 and document application 104 as described above in reference to FIG. 1. FIG. 18 depicts an alternate system 1800 that also may be used to perform such a process.

The manner in which elements of system 1700 and system 1800 may be used in perform the import process will now be described in reference to flowchart 1900 of FIG. 19. The method of flowchart 1900 is described herein by way of example only and is not intended to limit the present invention. Furthermore, although the steps of flowchart 1900 may be described with reference to various logical and/or physical entities shown in FIGS. 17 and 18, persons skilled in the relevant art(s) will readily appreciate that the method need not be implemented using such entities.

Figure 19:
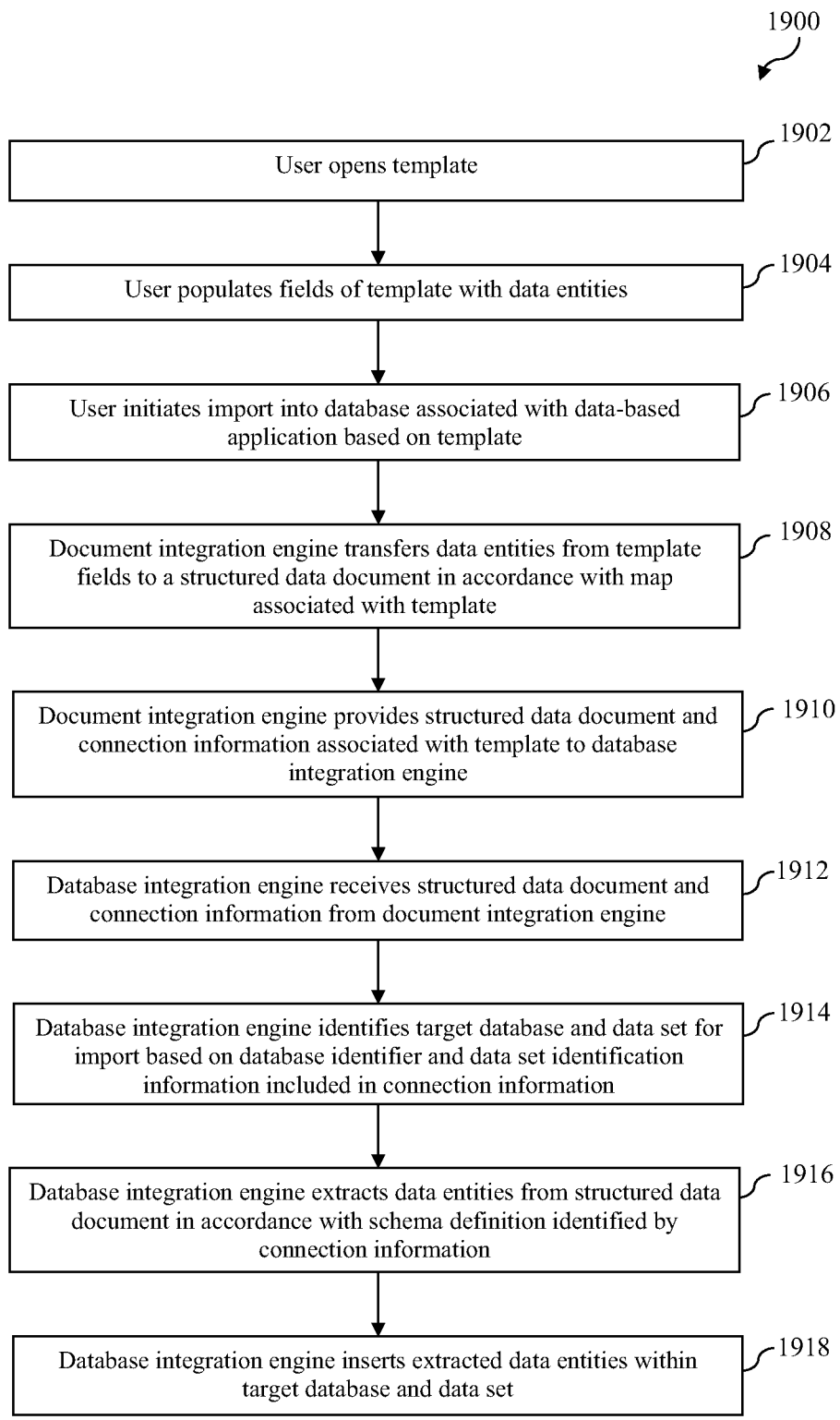
FIG. 19 depicts a flowchart of a method for importing data into a database associated with a data-based application based on a template associated with a document application in accordance with an embodiment of the present invention.

As shown in FIG. 19, the method of flowchart 1900 begins at step 1902 in which a user opens a template 1742 associated with document application 1704. For example, the user may open template 1742 from within the context of document application 1704 by interacting with document application UI logic 1746 within document application 1704 as shown in FIG. 17. Alternatively, the user may open template 1742 from within the context of data-based application 1702 by interacting with template UI logic 1826 within data-based application 1702 as shown in FIG. 18. In the latter case, the opening of template 1742 may cause an instance of document application 1704 to be launched if one has not already been launched so that further interaction with template 1742 can occur from within the context of document application 1704. In a still further implementation, a user may open template 1742 by interacting with a representation of the template that is presented to the user by an operating system or file management system of the computer system upon which document application 1704 is installed.

Step 1902 may include user selection of template 1742 from among a plurality of templates made available to a user as part of a template library, such as template library 1600 described above in reference to 1600. For example, document application UI logic 1746 or template UI logic 1826 may identify template 1742 from among a plurality of templates based on input from a user.

At step 1904, the user populates template fields 1762 of template 1742 with data entities. This step may comprise, for example, interacting with document application UI logic 1746 of document application 1704 to enter data entities into template fields 1762.

At step 1906, the user initiates an import into database 1722 associated with data-based application 1702 based on template 1742. The initiation of the import may occur through user interaction with document application UI logic 1746 as shown in FIG. 17 or through user interaction with template UI logic 1826 as shown in FIG. 18.

Step 1906 may also include selecting database 1722 from among a plurality of databases accessible by or associated with data-based application 1702. This selection may be made explicitly through user interaction with document application UI logic 1746 as shown in FIG. 17 or through user interaction with template UI logic 1826 as shown in FIG. 18. This selection may also be made implicitly through some other user gesture. For example, in an embodiment in which template 1742 is opened from within the context of data-based application 1702, selected database 1722 may be a database the user opened or was viewing prior to opening template 1742 in step 1902.

At step 1908, document integration engine 1744 transfers data entities from template fields 1762 to a structured data document 1714 in accordance with map 1764 associated with template 1742. Map 1764 is a set of information that maps each of template fields 1762 to elements or attributes of a schema definition 1712 that is to be used for performing the database import based on template 1742. In one embodiment, structured data document 1714 comprises an XML document and schema definition 1712 comprises an XSD, although the invention is not so limited.

At step 1910, document integration engine 1744 provides structured data document 1714 and connection information 1766 associated with template 1742 to database integration engine 1724. Connection information 1766 includes predefined information that identifies a data set within a database associated with data-based application 1702 into which data entities entered into template fields 1762 are to be imported and also includes an identifier of database 1722 based on the selection of database 1722 as the import target during step 1906. Connection information 1766 further includes information that identifies schema definition 1712 that is to be used for performing the database import based on template 1742.

At step 1912, database integration engine receives structured data document 1714 and connection information 1766.

At step 1914, database integration engine 1724 identifies database 1722 as the target database for import based on the database identifier included in connection information 1766 and identifies a data set within database 1722 as the target data set for import based on the data set identification information included in connection information 1766.

At step 1916, database integration engine 1724 extracts the data entities from structured data document 1714 in accordance with schema definition 1712 identified by connection information 1766.

At step 1918, database integration engine 1724 inserts the extracted data entities into the target data set within target database 1722. Database integration engine 1724 performs this step by mapping between elements and attributes of schema definition 1712 and a database schema associated with database 122. After the extracted data entities have been inserted within the target data set within target database 1722, the import process ends.

The foregoing process illustrates one method by which a template may be used to perform highly-automated, reliable and user-friendly imports of data into a database associated with a data-based application. The ability to provide a variety of such templates to a user advantageously allows a publisher or other party to provide ready-made import templates by which a user can import data organized in accordance with any of a wide variety of formats into a database associated with a data-based application.

2. Use of Templates for Export from a Database Associated with a Data-Based Application A process by which a user populates template fields of a template associated with a document application based on data stored in a database associated with a data-based application will now be described. System 1700 of FIG. 17 and system 1800 of FIG. 18 may each be used to perform such a process. The manner in which elements of system 1700 and system 1800 may be used in perform the export process will now be described in reference to flowchart 2000 of FIG. 20. The method of flowchart 2000 is described herein by way of example only and is not intended to limit the present invention. Furthermore, although the steps of flowchart 2000 may be described with reference to various logical and/or physical entities shown in FIGS. 17 and 18, persons skilled in the relevant art(s) will readily appreciate that the method need not be implemented using such entities.

Figure 20:
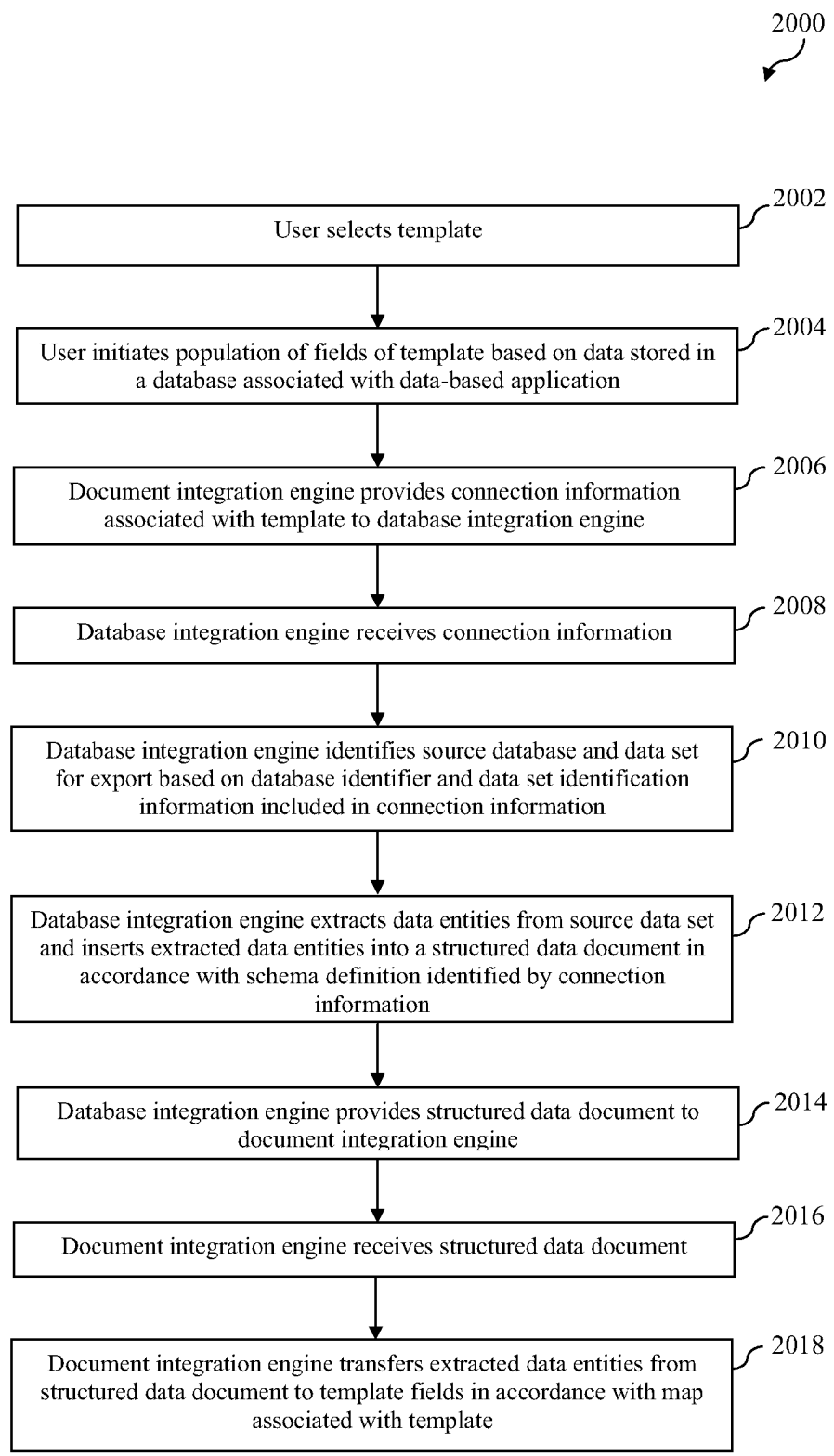
FIG. 20 depicts a flowchart of a method for populating fields within a template associated with a document application based on data stored in a database associated with a data-based application in accordance with an embodiment of the present invention.

As shown in FIG. 20, the method of flowchart 2000 begins at step 2002 in which a user selects a template 1742 associated with document application 1704 as the export target. For example, the user may select template 1742 from within the context of document application 1704 by interacting with document application UI logic 1746 within document application 1704 as shown in FIG. 17. Alternatively, the user may select template 1742 from within the context of data-based application 1702 by interacting with template UI logic 1826 within data-based application 1702 as shown in FIG. 18. In the latter case, the selecting of template 1742 may cause an instance of document application 1704 to be launched if one has not already been launched so that further interaction with template 1742 can occur from within the context of document application 1704 after the export process has completed. In a still further implementation, a user may select template 1742 by interacting with a representation of the template that is presented to the user by an operating system or file management system of the computer system upon which document application 1704 is installed.

It should be noted that selection of template 1742 during step 2002 may or may not entail opening template 1742. For example, in one embodiment, template 1742 is not opened until the export process has completed.

Step 2002 may include user selection of template 1742 from among a plurality of templates made available to a user as part of a template library, such as template library 1600 described above in reference to 1600. For example, document application UI logic 1746 or template UI logic 1826 may identify template 1742 from among a plurality of templates based on input from a user.

At step 2004, the user initiates population of fields of template 1742 based upon data exported from database 1722 associated with data-based application 1702. The initiation of the export may occur through user interaction with document application UI logic 1746 as shown in FIG. 17 or through user interaction with template UI logic 1826 as shown in FIG. 18.

Step 2004 may also involve selecting database 1722 from among a plurality of databases accessible by or associated with data-based application 1702. This selection may be made explicitly through user interaction with document application UI logic 1746 as shown in FIG. 17 or through user interaction with template UI logic 1826 as shown in FIG. 18. This selection may also be made implicitly through some other user gesture. For example, in an embodiment in which template 1742 is selected from within the context of data-based application 1702, selected database 1722 may be a database the user opened or was viewing prior to selecting template 1742 in step 2002.

At step 2006, document integration engine 1744 provides connection information 1766 associated with template 1742 to database integration engine 1724. Connection information 1766 includes predefined information that identifies a data set within a database associated with data-based application 1702 from which data entities are to be exported and also includes an identifier of database 1722 based on the selection of database 1722 as the export source during step 2004. Connection information 1766 further includes information that identifies schema definition 1712 that is to be used for performing the database export into template 1742.

At step 2008, database integration engine 1724 receives connection information 1766.

At step 2010, database integration engine 1724 identifies database 1722 as the source database for export based on the database identifier included in connection information 1766 and identifies a data set within database 1722 as the source data set for export based on the data set identification information included in connection information 1766.

At step 2012, database integration engine 1724 extracts data entities from the source data set within database 1722 and inserts the extracted data entities into a structured data document 1714 in accordance with schema definition 1712 identified by connection information 1766. Database integration engine 1724 performs this step by mapping between elements and attributes of a database schema associated with database 1722 and elements and attributes of schema definition 1712 identified by connection information 1766. Based on this mapping, database integration engine 1724 inserts the extracted data entities into structured data document 1714. In one embodiment, structured data document 1714 comprises an XML document and schema definition 1712 comprises an XSD, although the invention is not so limited.

At step 2014, database integration engine 1724 provides structured data document 1714 to document integration engine 1744. At step 2016, document integration engine 1744 receives structured data document 1714.

At step 2018, document integration engine 1744 transfers the extracted data entities from structured data document 1714 to template fields 1762 within template 1742 in accordance with map 1764 associated with template 1762. Map 1764 is a set of information that maps elements or attributes of a schema definition 1712 to each of template fields 1762. After template fields 1762 have been populated with the exported data entities, the export process ends.

The foregoing process illustrates one method by which a template may be used to perform highly-automated, reliable and user-friendly exports of data from a database associated with a data-based application into a template associated with a document application. The ability to provide a variety of such templates to a user advantageously allows a publisher or other party to provide ready-made export templates by which a user can export data from a database associated with data-based application into documents organized in accordance with any of a wide variety of formats.

The ability to provide a variety of such templates to a user also advantageously allows a publisher or other party to provide a variety of ready-made reports that can be used to present data stored in a database associated with a data-based application as well as data or graphics derived from such data. Depending upon the implementation, these reports may be fixed or customizable by a user. For example, in one implementation, a user may customize features, content and formatting associated with a report template to reflect personal preferences or to associate the report template with a particular business entity and then save the customized report template as a new template. In another implementation, a user may add or remove template fields to be used for import or export or to be used for deriving data or graphics displayed in the report template and then save the modified report template as a new template. These are just a few examples and are not intended to be limiting. The means for customizing or modifying the templates may comprise, for example, a GUI presented to the user by document application UI logic 1746.

3. Saving of Import/Export Templates

In accordance with one embodiment of the present invention, an import or export template may be created during an initial data transfer between a first document associated with a document application and a database associated with a data-based application and then advantageously saved and re-used by a user for performing subsequent data transfers between other documents and the database.

Figure 21:
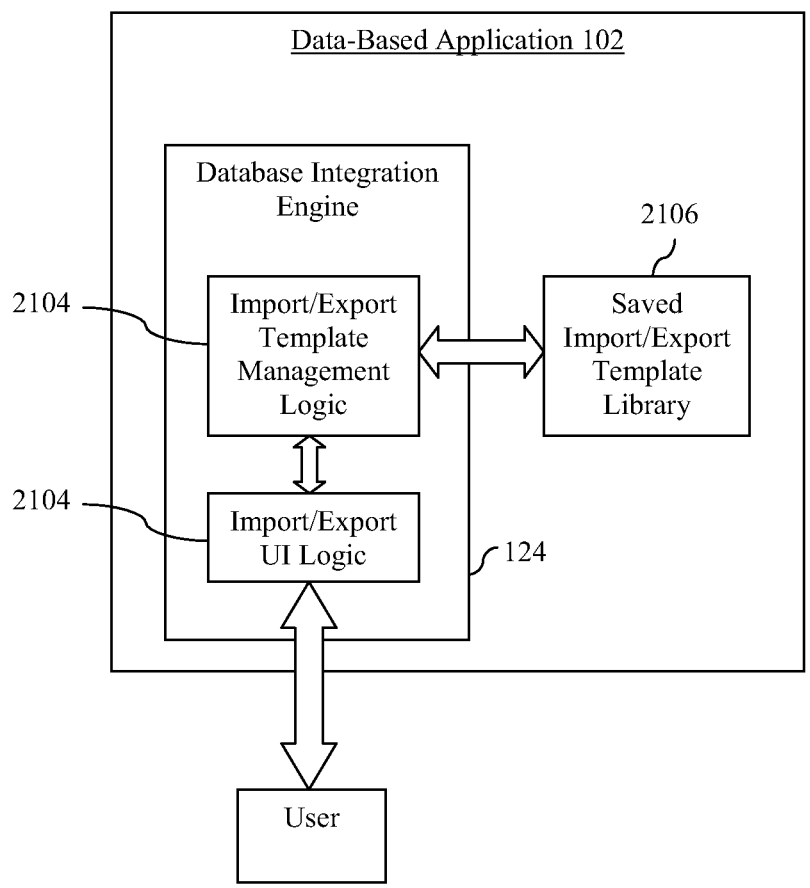
FIG. 21 is a block diagram of a data-based application that is configured to save and re-apply import/export templates in accordance with an embodiment of the present invention.
Figure 22:
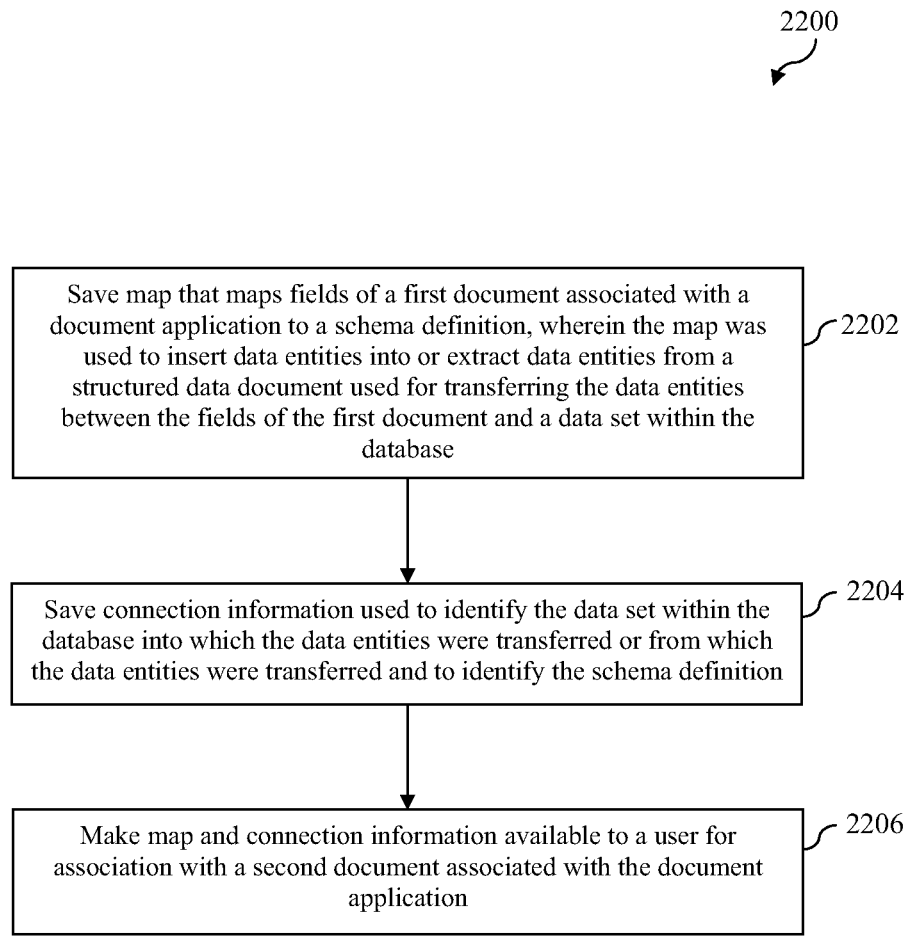
FIG. 22 depicts a flowchart of a method for saving and re-applying import/export templates in accordance with an embodiment of the present invention.

FIG. 21 depicts one implementation of data-based application 102 of FIG. 1 that includes such functionality for saving and re-using import or export templates. One manner in which the implementation of data-based application 102 of FIG. 21 may operate will now be described in reference to flowchart 2200 of FIG. 22. The method of flowchart 2200 is described herein by way of example only and is not intended to limit the present invention. Furthermore, although the steps of flowchart 2200 may be described with reference to various logical and/or physical entities shown in FIG. 21, persons skilled in the relevant art(s) will readily appreciate that the method need not be implemented using such entities.

For the purpose of describing the method of flowchart 2200, it is assumed that data has been imported into database 122 associated with data-based application 102 from document 142 associated with document application 104 by way of one of the scenarios described above in Sections B.2 or B.4 or that data has been exported from database 122 into document 142 by way of one of the scenarios described above in Sections B.1 or B.3.

As discussed in detail above, in each instance, the import or export process involves the generation or obtaining of a map and connection information associated with document 142. The map maps fields of document 142 to schema definition 112, and was used to insert data entities into or extract data entities from structured data document 114 used for transferring the data entities between the fields of document 142 and a data set within database 122. The connection information was used to identify the data set within database 122 into which the data entities were transferred or from which the data entities were transferred and to identify schema definition 112.

The method of flowchart 2200 begins at step 2202, in which import/export template management logic 2104 saves the map that was used during the import or export. At step 2204, import/export template management logic 2014 saves the connection information that was used during the import or export. Taken together, the saved map and connection information comprises an import or export template that may be re-used by a user to import or export data from other documents associated with document application 104. These templates may be stored in memory as part of a saved import/export template library 2106.

In one embodiment, steps 2202 and 2204 are performed automatically by import/export template management logic 2104 in a situation in which an import into or export out of a database associated with data-based application 102 has completed and a template has not already been saved. In another embodiment, steps 2202 and 2204 are only performed responsive to user input. For example, after an import or export process has completed, import/export UI logic 2104 may present a GUI to a user offering to save an import/export template if one has not been saved already. In this example, a template will only be saved if the user indicates through interaction with the GUI that the template should be saved.

At step 2206, import/export template management logic 2104 makes the saved map and connection information available to a user as a saved import or export template that can be applied to another document associated with the document application. This step may be performed by presenting information identifying the saved template to the user via a GUI presented by import/export UI logic 2104.

Re-application of an import/export template involves associating the saved map with a new document such that fields of the new document will map to elements and attributes of schema definition 112 in the same manner that the fields of document 142 were mapped to elements and attributes of schema definition 112. Re-application of an import/export template also involves associating the saved connection information with a new document such that same data set within a database associated with data-based application 102 can be targeted for import or export and such that the same schema definition 112 can be used for import/export. In an embodiment, the re-application of a saved import/export template is performed by import/export template management logic 2104 responsive to user input.

The foregoing process for saving and re-applying import/export templates advantageously allows a user to save map and connection information associated with a data transfer between a document having a particular format and a data set that stores a particular set of data entities so that such information can be re-used to facilitate highly-automated data transfers between like document types and like data set types. This is particularly beneficial in situations where a user anticipates transferring data between a series of like-formatted documents and a database or vice versa.

E. Example Computer System Implementation

Figure 23:
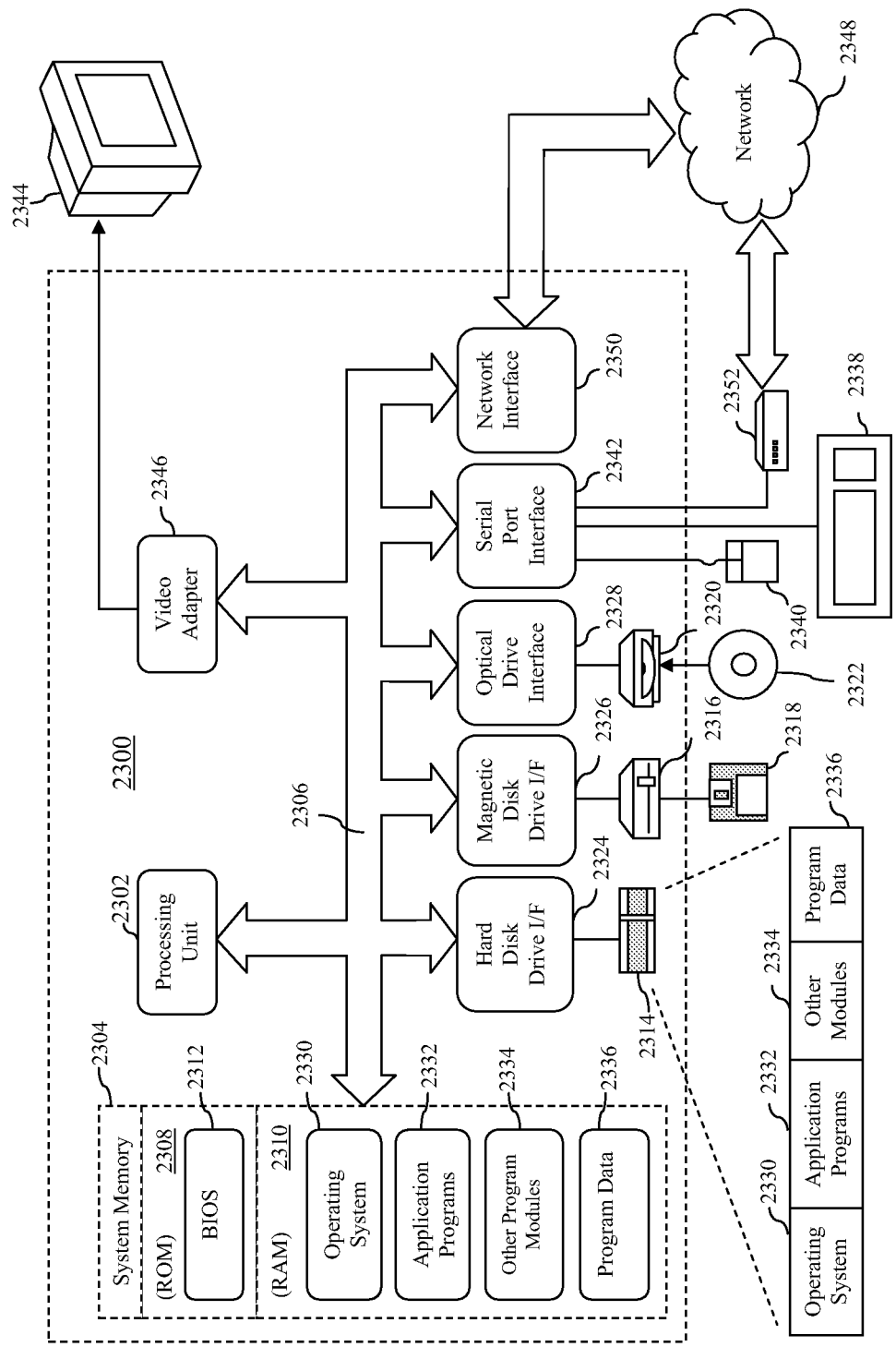
FIG. 23 depicts an example processor-based computer that may be used to implement various aspects of the present invention.

FIG. 23 depicts an exemplary implementation of a computer 2300 upon which various aspects of the present invention may be executed. Computer 2300 is intended to represent a general-purpose computing device in the form of a conventional personal computer.

As shown in FIG. 23, computer 2300 includes a processing unit 2302, a system memory 2304, and a bus 2306 that couples various system components including system memory 2304 to processing unit 2302. Bus 2306 represents one or more of any of several types of bus structures, including a memory bus or memory controller, a peripheral bus, an accelerated graphics port, and a processor or local bus using any of a variety of bus architectures. System memory 2304 includes read only memory (ROM) 2308 and random access memory (RAM) 2310. A basic input/output system 2312 (BIOS) is stored in ROM 2308.

Computer 2300 also has one or more of the following drives: a hard disk drive 2314 for reading from and writing to a hard disk, a magnetic disk drive 2316 for reading from or writing to a removable magnetic disk 2318, and an optical disk drive 2320 for reading from or writing to a removable optical disk 2322 such as a CD ROM, DVD ROM, or other optical media. Hard disk drive 2314, magnetic disk drive 2316, and optical disk drive 2320 are connected to bus 2306 by a hard disk drive interface 2324, a magnetic disk drive interface 2326, and an optical drive interface 2328, respectively. The drives and their associated computer-readable media provide nonvolatile storage of computer-readable instructions, data structures, program modules and other data for the server computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2330, one or more application programs 2332, other program modules 2334, and program data 2336. Application programs 2332 or program modules 2334 may include, for example, logic for implementing data-based application 102, document application 104, data-based application 1702, or document application 1704 as described herein. Application programs 2332 or program modules 2334 may also include, for example, logic for implementing one or more of the steps of the flowcharts depicted in FIG. 3, 5, 7, 9, 11, 13, 14, 19, 20 or 22. Thus each step illustrated in those figures may also be thought of as program logic configured to perform the function described by that step.

A user may enter commands and information into computer 2300 through input devices such as keyboard 2338 and pointing device 2340. Other input devices (not shown) may include a microphone, joystick, game pad, satellite dish, scanner, or the like. These and other input devices are often connected to the processing unit 2302 through a serial port interface 2342 that is coupled to bus 2306, but may be connected by other interfaces, such as a parallel port, game port, or a universal serial bus (USB).

A monitor 2344 or other type of display device is also connected to bus 2306 via an interface, such as a video adapter 2346. Monitor 2344 is used to present a GUI that assists a user/operator in configuring and controlling computer 2300. In addition to the monitor, computer 2300 may include other peripheral output devices (not shown) such as speakers and printers.

Computer 2300 is connected to a network 2348 (e.g., the Internet) through a network interface 2350, a modem 2352 or other means for establishing communications over the network. Modem 2352, which may be internal or external, is connected to bus 2306 via serial port interface 2342.

As used herein, the terms "computer program medium" and "computer-readable medium" are used to generally refer to media such as the hard disk associated with hard disk drive 2314, removable magnetic disk 2318, removable optical disk 2322, as well as other media such as flash memory cards, digital video disks, random access memories (RAMs), read only memories (ROM), and the like.

As noted above, computer programs (including application programs 2332 and other program modules 2334) may be stored on the hard disk, magnetic disk, optical disk, ROM, or RAM. Such computer programs may also be received via network interface 2350 or serial port interface 2342. Such computer programs, when executed, enable computer 2300 to implement features of the present invention discussed herein. Accordingly, such computer programs represent controllers of computer 2300.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:
    importing data into a database associated with a data-based application based on a template associated with a document application by:
        transferring data entities entered into fields of the template by a user to a structured data document in accordance with a map associated with the template; and
        providing the structured data document and connection information associated with the template to a database integration engine;
        wherein the connection information identifies a schema definition to be used by the database integration engine to extract the data entities from the structured data document, wherein the connection information identifies a data set within the database within which the extracted data entities are to be inserted by the database integration engine, wherein the connection information defines a link between the fields of the template and the data set within the database and wherein the connection information facilitates automated updates of the data set within the database based on and data currently stored in the fields of the template.

2. The method of claim 1, wherein the template associated with the document application comprises:
    a spreadsheet associated with a spreadsheet application.

3. The method of claim 1, wherein the template associated with the document application comprises:
    a word processing document associated with a word processing application.

4. The method of claim 1, wherein transferring the data entities entered into fields of the template by a user to a structured data document comprises transferring the data entities into an Extensible Markup Language (XML) document and wherein the schema definition identified by the connection information comprises an XML schema definition.

5. The method of claim 1, wherein the map associated with the template maps each of the template fields to an element or attribute of the schema definition.

6. The method of claim 1, further comprising:
    obtaining a portion of the connection information that identifies the data set within the database from the user.

7. The method of claim 1, further comprising:
    providing access to a plurality of templates to the user, wherein each template is associated with a corresponding map and connection information; and
    identifying the template to be used for importing data into the database based on user input.

8. A method comprising:
    populating fields within a template associated with a document application based on data stored in a database associated with a data-based application by:
        providing connection information associated with the template to a database integration engine, wherein the connection information identifies a data set within the database from which data entities are to be extracted, wherein the connection information identifies a schema definition to be used by the database integration engine to generate a structured data document that includes the extracted data entities, wherein the connection information defines a link between the fields within the template and the data set within the database and wherein the connection information facilitates automated updates of the fields within the template with the latest data stored in the data set within the database;

receiving the structured data document from the database integration engine; and transferring the extracted data entities from the structured data document to the template fields in accordance with a map associated with the template.

9. The method of claim 8, wherein the template associated with the document application comprises:
a spreadsheet associated with a spreadsheet application.

10. The method of claim 8, wherein the template associated with the document application comprises:
a word processing document associated with a word processing application.

11. The method of claim 8, wherein transferring the extracted data entities from the structured data document comprises transferring the extracted data entities from an Extensible Markup Language (XML) document and wherein the schema definition identified by the connection information comprises an XML schema definition.

12. The method of claim 8, wherein the map associated with the template maps each of the template fields to an element or attribute of the schema definition.

13. The method of claim 8, further comprising:
obtaining a portion of the connection information that identifies the data set within the database from a user.

14. The method of claim 8, further comprising:
providing access to a plurality of templates to a user, wherein each template is associated with a corresponding map and connection information; and
identifying the template for which fields are to be populated based on user input.

15. The method of claim 8, further comprising:
providing a means by which a user can customize content and/or a format of the template.

16. The method of claim 15, wherein providing a means by which a user can customize content of the template comprises:
providing a means by which a user can add or remove one or more of the fields to be populated within the template.

17. A method comprising:
providing a template for transferring data into or out of a database associated with a data-based application by:
saving a map that maps fields of a first document associated with a document application to a schema definition, wherein the map was used to insert data entities into or extract data entities from a structured data document used for transferring the data entities between the fields of the first document and a data set within the database;
saving connection information used to identify the data set within the database into which the data entities were transferred or from which the data entities were transferred and to identify the schema definition, wherein the connection information defines a link between the fields of the first document and the data set within the database and wherein the connection information facilitates automated updates of the fields of the first document with the latest data stored in the data set within the database or facilitates automated updates of the data set within the database with the latest data stored in the fields of the first document; and
making the saved map and connection information available to a user for association with a second document associated with the document application.

18. The method of claim 17, wherein the first document associated with the document application and the second document associated with the document application each comprise a spreadsheet associated with a spreadsheet application.

19. The method of claim 17, wherein the first document associated with the document application and the second document associated with the document application each comprise a word processing document associated with a word processing application.

20. The method of claim 17, further comprising:
associating the saved map and connection information with the second document associated with the document application responsive to user input.

* * * * *